United States Patent [19]
Shyong

[11] Patent Number: 5,016,183
[45] Date of Patent: May 14, 1991

[54] TEXTILE DESIGN SYSTEM AND METHOD

[75] Inventor: Emory Shyong, Grand Rapids, Mich.

[73] Assignee: Computer Design, Inc., Grand Rapids, Mich.

[21] Appl. No.: 243,690

[22] Filed: Sep. 13, 1988

[51] Int. Cl.⁵ .............................................. G06F 15/46
[52] U.S. Cl. .................................... 364/470; 358/101;
364/468; 364/191; 364/521
[58] Field of Search .............. 364/470, 468, 188, 189,
364/191-193, 514, 518, 521, 522, 900 MS File;
382/1, 8, 9, 41, 47, 48, 49; 358/101, 107; 66/1
R, 231, 232, 238, 75.2

[56] References Cited

U.S. PATENT DOCUMENTS

| | | | |
|---|---|---|---|
| 4,346,366 | 8/1982 | Kajiura et al. | 364/470 |
| 4,608,642 | 8/1986 | Shima | 364/470 |
| 4,807,143 | 2/1989 | Matsuura | 364/470 |

OTHER PUBLICATIONS

Lourie, Janice R. "Textile Graphic/Computer-Aided" (1973, Chapter 9, pp. 171-188).
Foley, J. D., Van Dam, A. "Fundamentals of Interactive Computer Graphics", (pp. 611-616, Addison-Wesley, (1982).
Excerpt from "Encyclopedia of Textiles", Third Edition (pp. 319-328 Prentice-Hall, 1980).

*Primary Examiner*—Joseph Ruggiero
*Attorney, Agent, or Firm*—Price, Heneveld, Cooper, DeWitt & Litton

[57] ABSTRACT

A realistic image of woven cloth surface is provided by a system which receives a user input of a yarn cross section design to produce a side view image of a resultant spun or unspun yarn and which utilizes either basic weave patterns or user-designed patterns to produce a woven cloth images. Shading is applied to the cross-sectional image of each fiber selected in a yarn to provide a realistic image of the resultant spun-yarn. Shading is also applied to portions of each warp and fill thread in the vicinity of their intersecting each other to provide a realistic woven fabric surface image.

35 Claims, 17 Drawing Sheets

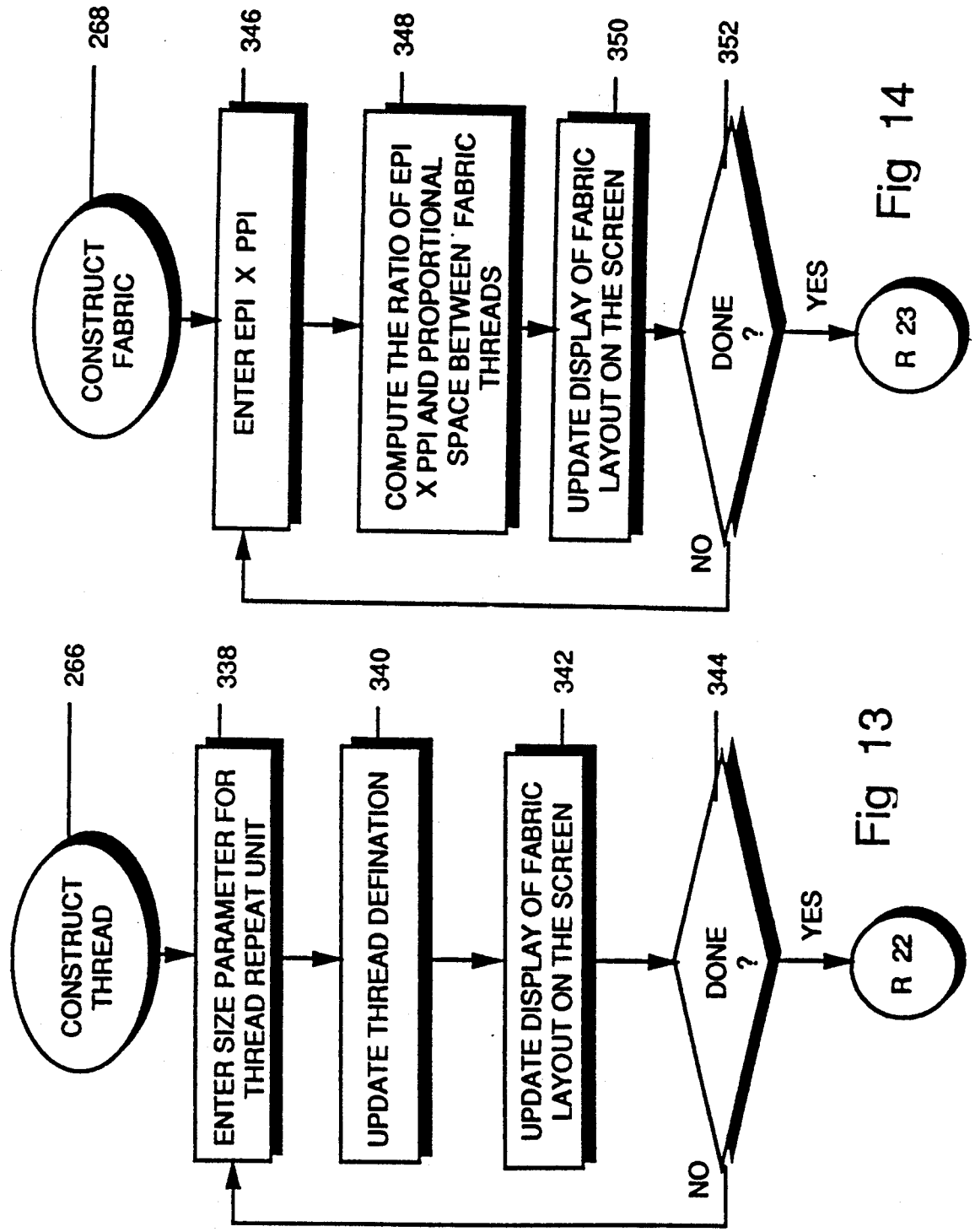

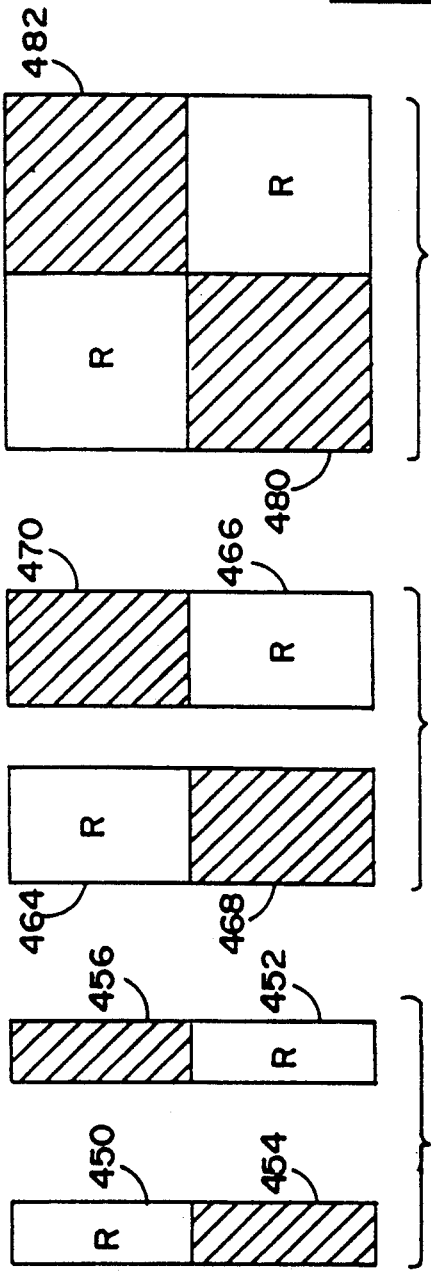
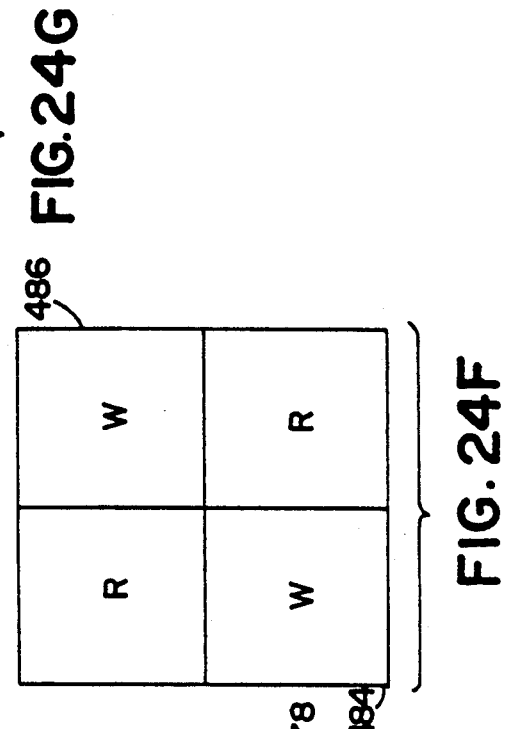
FIG. 24A FIG. 24B FIG. 24C FIG. 24D FIG. 24E FIG. 24F FIG. 24G

TEXTILE DESIGN SYSTEM AND METHOD

BACKGROUND OF THE INVENTION

The invention is in the field of computer-aided design (CAD) systems, and specifically relates to a system and method for simulating woven fabric surface detail with emphasis on realistic thread interlacing and color blending. Immediate applications of the present invention are apparel and textile design industries.

Preparation of fabric sample swatches costs millions of dollars for the textile mills and thousands of man hours in the design studio annually. Because of the tremendous amount of time involved, mills and designers are forced to work on fashion styles and trends at least a year in advance in order to cope with the time-consuming process of sample swatch preparation. From the mills' standpoint, the sample swatch operation intervenes the normal production schedule, increases machine down-time, and wastes human and natural resources. From the designer's standpoint, it delays response to the market changes, causes uncertainty in forecasting future styles and fashion trends, and wastes valuable human creativity. The present invention addresses all of the above problems.

In the field of computer-aided design, one of the objectives of any CAD system is to realistically simulate an image of an object, including color, shape, and construction, on a graphic visual input/output device, such as a cathode ray terminal (CRT). In case of woven fabric, surface detail modeling to capture the intricacies of thread interlacing and multiple shades of color threads are not possible to achieve through the practice of traditional symbolic representation of weaves. Because threads are actually represented by solid color blocks in known prior art systems, the interlacings between warp ends and filling picks are painted according to the format of grid paper, where the grids marked by an "X" are painted with the color of warp ends and the blank grids are painted with the color of filling picks.

In a real situation, however, threads are shaded by various light sources. The spinning of fibers also creates shaded visual appearance. In addition, the interlacing between warp ends and filling picks produces shading variation. Therefore, all the shades generated by various factors as mentioned above, must be seriously taken into consideration when two sets of warp and filling threads are interlaced together in order to obtain a realistic woven fabric surface detail. A graphic, instead of symbolic, approach provides all the possibilities to address the problems mentioned, since graphic representation of woven fabric physically simulates each individual thread going up and down over one another in the fabric surface. The ability to design and construct yarns used in such a woven fabric is also crucial to obtaining a realistic image of a woven fabric on the traffic visual input/Output device. Designing and constructing multi-color threads require the twisting of pre-dyed fibers of different colors in order to achieve the visual appearance of color randomness. The symbolic designing of woven fabric, as a matter of fact, over-simplifies the complexity of surface detail. Moreover, the lack of ability to design and construct multi-color threads makes it beyond the reach of symbolic approaches to achieve the realism of woven fabric on the graphic visual input/output device of a CAD system. Those are the problems the present invention addresses.

SUMMARY OF THE INVENTION

The present invention provides a unique solution to the simulation of spinning fibers to form a yarn, generating weaves in almost limitless variations, and preparing a woven fabric surface in detailed finished form, in order to eliminate the costly and time-consuming practice of sample swatch preparation.

The present invention provides the user with the capability of constructing spun and non-spun yarns which may be of staple or filament fibers. The user is provided a design input for the cross section of a yarn by placing various shapes of natural and man-made fibers or fiber strands together, and then is provided tools for spinning or entangling the cross section to make a spun yarn. In order to generate a spun yarn, the user has the choice of "REGULAR" and "NOVELTY" options to selectively generate a "fixed" number of turns-per-inch (TPI) or a "random" number of turns-per-inch along the length of a yarn. Also, the user is provided a selection of the spinning direction between clockwise and counterclockwise. As the fiber layout is executed, an enlarged longitudinal side view of a resulting yarn, plus several reduced diameter side views more closely matched to actual thread sizes in three-pixel, two-pixel, and one-pixel wide yarns, are shown side-by-side on the graphic CRT. When the yarn design is complete, the user may, if satisfied, save the yarn in a data storage unit, such as hard disk or tape, for later retrieval, or may modify the fiber layout and reexecute the automated image generation.

The invention is also capable of simulating non-spun threads. The user may use the "paint box" function to design or construct the fiber layout in longitudinal side view of a yarn. Without the twisting process, the fiber layout in longitudinal side view is resized to usable three-pixel, two-pixel, and one-pixel diameters which are displayed on the graphic CRT. This feature presents a great deal of potential for designing and constructing a variety of novelty yarns, such as air-textured, slub, loop, and nep yarn, etc.

The invention further provides for weave patterns through either user creation, retrieval, or available through default in order to apply yarns which had been previously constructed and saved on a data storage unit, to simulate a woven fabric surface detail. The present invention provides all the "tools" required to generate various weaves, mainly for Dobby and Cam looms. The five known basic weaves, including plain, twill, rib, satin, and basket may be developed with the user selecting parameters compatible with the desired weave and the system initialized with the remaining parameters. Variations of those five basic weaves and completely unique weave patterns may be obtained through the capability of the user's manipulation of the lifting sequences of harnesses known as "chain draft" ("CD") and the drawing sequence of warp ends through harnesses known as "drawing-in draft" ("DID"). The design of the weave may be visualized in both graphic and symbolic representations. As a desired weave is created, the user may save it on a data storage unit for retrieval later, or may use it for the simulation of woven fabric surface detail. Moreover, an important and useful feature is provided for reversing the CD/DID manipulation. The user is provided tools for designing random weave patterns which are displayed on the graphic CRT. The system determines the optimum CD and DID for the user's design including the minimum number of harnesses required to weave the design. The user is able to experiment with a variety of weave structures and evaluate their cost-effectiveness by comparing the minimum number of harnesses required, as the cost of manufacturing is proportional to the number of harnesses used in the weaving process.

Another aspect of the present invention is the ability to use existing yarns and weaves to obtain a realistic image of woven fabric surface detail on a graphic CRT. The present invention provides a set of functions for the user to retrieve, apply, edit, browse, and construct yarns and weaves. A set of current warp and filling thread layout is displayed on the graphic CRT. Default warp and filling thread layout will be presented unless there is an existing thread layout. However, the present invention provides complete flexibility for the user to edit the warp and filling thread layout before the design is generated. For example, the user may pick a color from the color palette to tint the thread layout or may browse yarns from a data storage unit and assign them to the layout. In addition, the present invention allows the user to "GROUP" threads of the warp and filling layout. A bracket indicating a group of threads will be shown over the top of warp layout or to left of filling layout. After a group of threads is made, these grouped threads will be treated as a single thread. This feature provides for the design of complicated plaids. One button stroke from the locating device will tint or replace an entire group of threads with a new color or a new yarn.

Moreover, the present invention allows the user to delete threads from the warp and filling layout, assign different ends-per-inch (EPI) and picks-per-inch (PPI) to the warp and filling layout and vary the thread repeat lengths from five inches to one-inch lengths (in one-inch increments). The maximal fabric dimension allowed is 1240 warp threads by 1240 filling threads. However, due to the size of the CRT, only 293 warp and 233 filling threads can be shown on the graphic CRT simultaneously. Therefore, the present invention provides a set of functions which allow the visualization of any portion of the warp and filling layout via image scrolling on the CRT screen.

Once a satisfactory warp and filling thread layout is found, the user may execute the entire warp and filling layout or only a portion of layout by specifying the area of interest to be woven. The image of the woven fabric includes shading of portions of each warp and fill thread determined as a function of the relative diameters of the threads and the over/under relationship of the thread portions. In this manner, the present invention provides an exceptionally realistic image of the woven fabric surface. Once created, woven fabric designs, including the thread layouts that generated them, may be stored for later retrieval. Fabric image may be resized down to an approximate life-size without losing the surface detail of the woven fabric.

It is the objective of the present invention to provide a method for the textile and apparel industries to improve or revolutionize their traditional sample swatch preparation processes. From the beginning to the end, the present invention provides the user a systematic method for designing and visualizing multi-color shaded threads, generating and manipulating various weave patterns, and combining both yarns and weaves to create woven fabric images having very realistic surface detail, including appropriate shading of the portions of the yarn which define the fabric. The present invention may be used as a stand-alone system for the sole purpose of designing surface detail of woven fabrics, or as a portion of a larger CAD system, where realistic woven fabric is required in a variety of design applications.

BRIEF DESCRIPTION OF THE DRAWINGS

FIG. 13 is a flow chart illustrating the "construct thread" function of the present invention;

FIG. 14 is a flow chart illustrating the "construct fabric" function of the present invention;

FIGS. 24(a)-(24g) are diagrams of a woven fabric pattern being generated with shading.

FIG. 24a illustrates a pair of one-pixel warp threads which, in FIG. 24b, are woven with one-pixel fill threads. FIG. 24c illustrates a pair of two-pixel warp threads which, in FIG. 24d, are woven with a pair of two-pixel fill threads. FIG. 24e illustrates a pair of three-pixel warp threads which, in FIG. 24f, are woven with a pair of three-pixel fill threads. FIG. 24g illustrates the weave matrix applied in FIGS. 24b, 24d and 24f.

DETAILED DESCRIPTION OF THE PREFERRED EMBODIMENT

Figure 1:
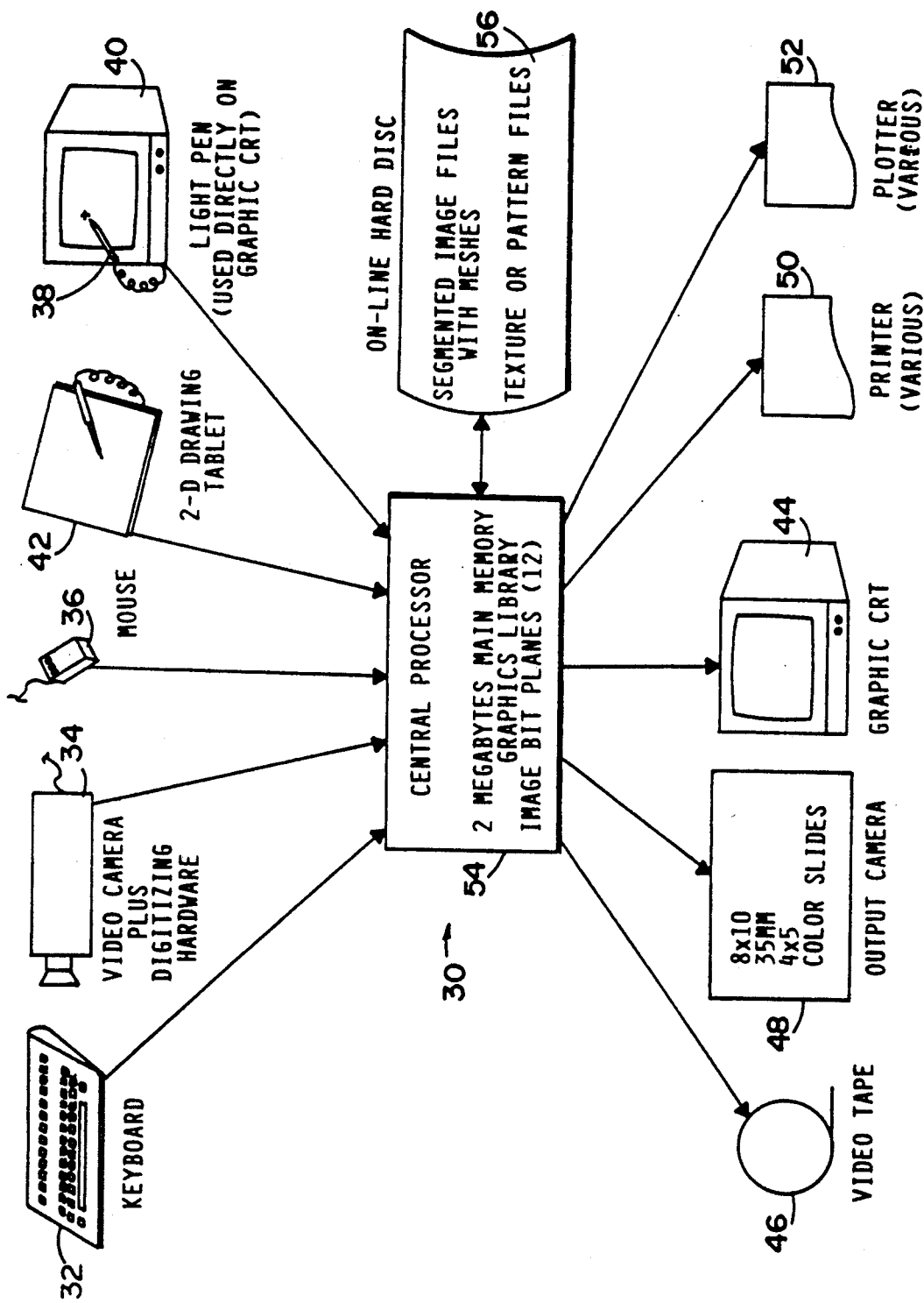
FIG. 1 is an illustration of a CAD hardware system useful in the present invention.

Although the present invention finds immediate application in the apparel and textile industries and the illustrated embodiment focuses on that application, the present invention has potential application in a wide range of design activities. In carrying out the invention, the illustrated embodiment provides three sets of functions which may be executed in any sequence. The functions include the design of yarns, design of weaves and the design of woven fabrics. The preferred method is to utilize the yarn design function to create a spun or non-spun yarn and the weave function to design a desired weave pattern. Finally, the designed yarns and weaves may be applied in the woven fabrics design function to obtain a realistic visual image of the ultimate product utilizing design yarns and weaves. The functions may be carried out in any sequence because default parameters are provided for weaves and woven fabrics should the user not design or specify a yarn or weave pattern. An effort has been made throughout to provide a user-friendly system requiring minimal training.

A. SYSTEM HARDWARE

Computer system 30 includes input devices such as keyboard 32, video camera 34, mouse 36 and light pen 38 usable in combination with a graphic CRT 40 as locating instruments, and a two-dimensional drawing table 42. The output of system 30 may be directed to a graphic CRT 44, which is a high resolution 768 by 1024 pixels, video tape recorder 46, output camera 48 and printers 50 and 52. A central processing unit 54 of system 30 is either 16-bit or 32-bit and includes two megabytes of main memory and 140 megabytes of secondary memory on hard disk 56. In the illustrated embodiment, system 34 is a Silicone Graphics, Inc. IRIS workstation utilizing UNIX operating system developed by American Telephone and Telegraph, Inc. and a Silicone Graphics, Inc. standard graphic software system.

B. DESCRIPTION OF THE SOFTWARE

1. Yarn Design

Figure 2:
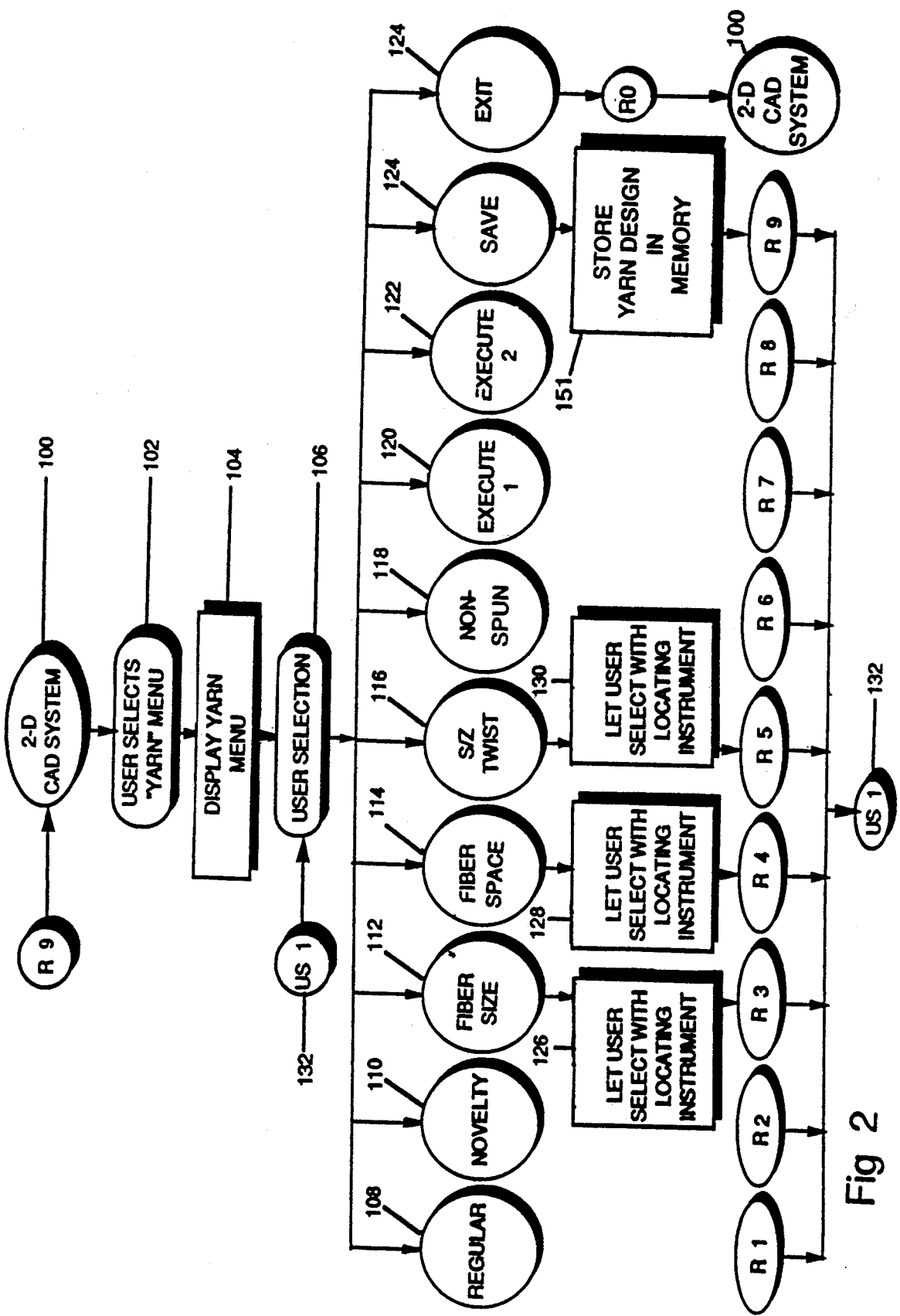
FIG. 2 is a flow chart illustrating the yarn design function of the present invention.

FIG. 2 illustrates the main flow chart for the yarn design function, and outlines a function that allows the user to design and obtain a realistic image of spun and non-spun yarn, from a menu displayed on the system. The system, as a whole, is invoked from the exits to a standard two-dimensional computer-aided design software system 100. Once invoked from the two-dimensional CAD system 100, the function illustrated in FIG. 2 allows the user to select (102, 104, 106) from a menu anY of the individual sub-functions 108–124 associated with yarn design. Referring to the flow chart, note that there are nine sub-functions 108–124 that may be invoked following a user-selection, plus an "exit" 125 function. Each of the sub-functions 108–124 executes some portion of the initial yarn design process. Once each of these sub-functions 108–124 finishes its task, control is returned to the yarn design function illustrated in FIG. 2, indicated by the labels R1 through R9. Control is then passed back to the menu selection (US1) 132 so that the user may proceed to the next sub-function. When the "exit" function is selected, this function terminates and control passes back to the two-dimensional CAD system 100.

The "fiber size" function 112, "fiber space" function 114 and "S/Z twist" function 116 allow the user to select, with a locating instrument such as mouse 36 or light pen 38, the parameters required for designing a spun yarn. When each of these functions is invoked, the system prompts the user to enter the desired information. When the fiber space function 114 is invoked, an area having a grid superimposed thereon is displayed on CRT 44 and may be enlarged or made smaller (126) by the use of an indicating device which alters the size of the grid squares within the area which designates, at grid nodal points, the location of the centers of the fibers. Thus, enlarging the grid increases fiber spacing and vice versa. When the fiber size function 112 is invoked, the user is prompted to select (128) on the grid pattern the diameter of the cross section of the threads that are desired. The "S/Z twist" function 116 allows the user to set (130) a switch to effect counterclockwise (S) or clockwise (Z) rotation of the fibers in the spun yarn.

Figure 3:
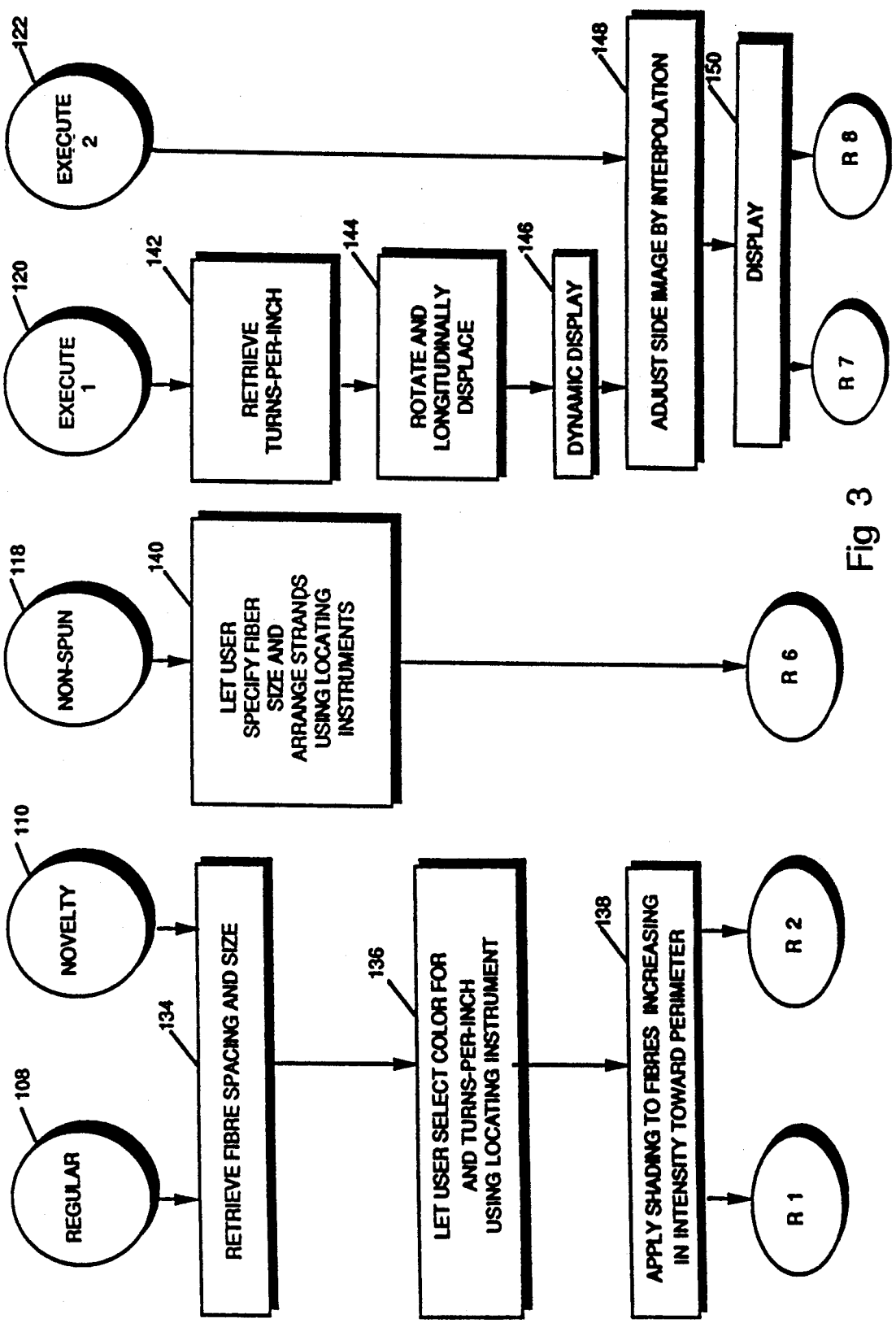
FIG. 3 is a flow chart illustrating the spun and non-spun yarn design functions of the present invention.

When the user selects the "regular" sub-function 108 or the "novelty" sub-function 110 (FIG. 3), the system retrieves (134) the fiber spacing and size parameters entered by the user. If no parameters have been entered by the user, default parameters are selected from memory. The system lets the user select at 136, from a color palette that is an accessory to the graphics software, the color to be applied to particular fibers and the turns-per-inch parameter using locating instruments. The system applies (138) shading to the cross-sectional image of each of the fibers having an intensity variation within each fiber that is determined as a function of the position of the portion within the fiber cross section. The shading that is applied by the system to each fiber is a sequence of laterally extending shading bands which increase in degree of shading from the center of each fiber to its outer perimeter. Shading bands toward the perimeter of the fiber are assigned a shading value in the preferred embodiment that is approximately three times the intensity of shading provided at the center of the fiber. It has been discovered that this shading pattern provides the most realistic depiction of the resulting yarn. It is believed that the adjacent fibers at the perimeter of each fiber cause an increase in shadows cast on each fiber which increases the amount of shading required at the perimeter. This effect is not experienced at the interior of fibers.

After the spun-yarn sub-functions 108 and 110 have been performed, the "execute 1" sub-function 120 is invoked by the user in order to spin the yarn. The function retrieves (142) the turns-per-inch (TPI) specified by the user in the "regular" 108 "novelty" 110 sub-functions and rotates (144), while simultaneously longitudinally displacing the parameters of the yarn cross section. The result of this operation on the fiber layout parameters is dynamically displayed at 146 as the longitudinal side view of the developing yarn. If the turns-per-inch parameter retrieved at 142 was specified through the "regular" 108 function, the rotation and longitudinal displacement (144) is constant throughout the spinning process. If, however, the turns-per-inch was specified through the "novelty" sub-function 110, the TPI is randomly varied within a range less than the TPI specified by the user, to create a novel thread having a random twist pattern.

As an enlarged longitudinal side view is imaged while the yarn is spun (144, 146), the system additionally displays in the preferred embodiment, three longitudinal side view images of yarn designs (148) which are scaled from the enlarged side view of the designed yarn by linear interpolation to a one-pixel, two-pixel and three-pixel width image. The three images are displayed 150 and may be stored in memory (151) for subsequent use by invoking the "save" sub-function 124.

When the user selects the "non-spun" function 118, a longitudinal side view image are displayed on CRT 44 and the user is prompted to use a locating instrument, such as light pen 38, to specify (140) the fiber size by choosing a "brush size" from the "paint box" standard function of the graphic software and designing fiber strands on the yarn side view image using a locating instrument and one of two hundred fifty-six colors available from the "paint box" standard function. When the user is satisfied with the non-spun yarn input, the "execute 2" function 122 is invoked. The "execute 2" function 122 scales the enlarged longitudinal side view at 148 by linear interpolation to produce one-pixel, two-pixel and three-pixel yarn images of the user-designed non-spun yarn which are displayed (150) and may be stored in memory (151) by invoking the "save" function 124. The previously-described functions in the yarn design function may be invoked to modify an existing yarn design following the "execute 1" 120 or "execute 2" 122 sub-functions.

2. Weave Design

Figure 4:
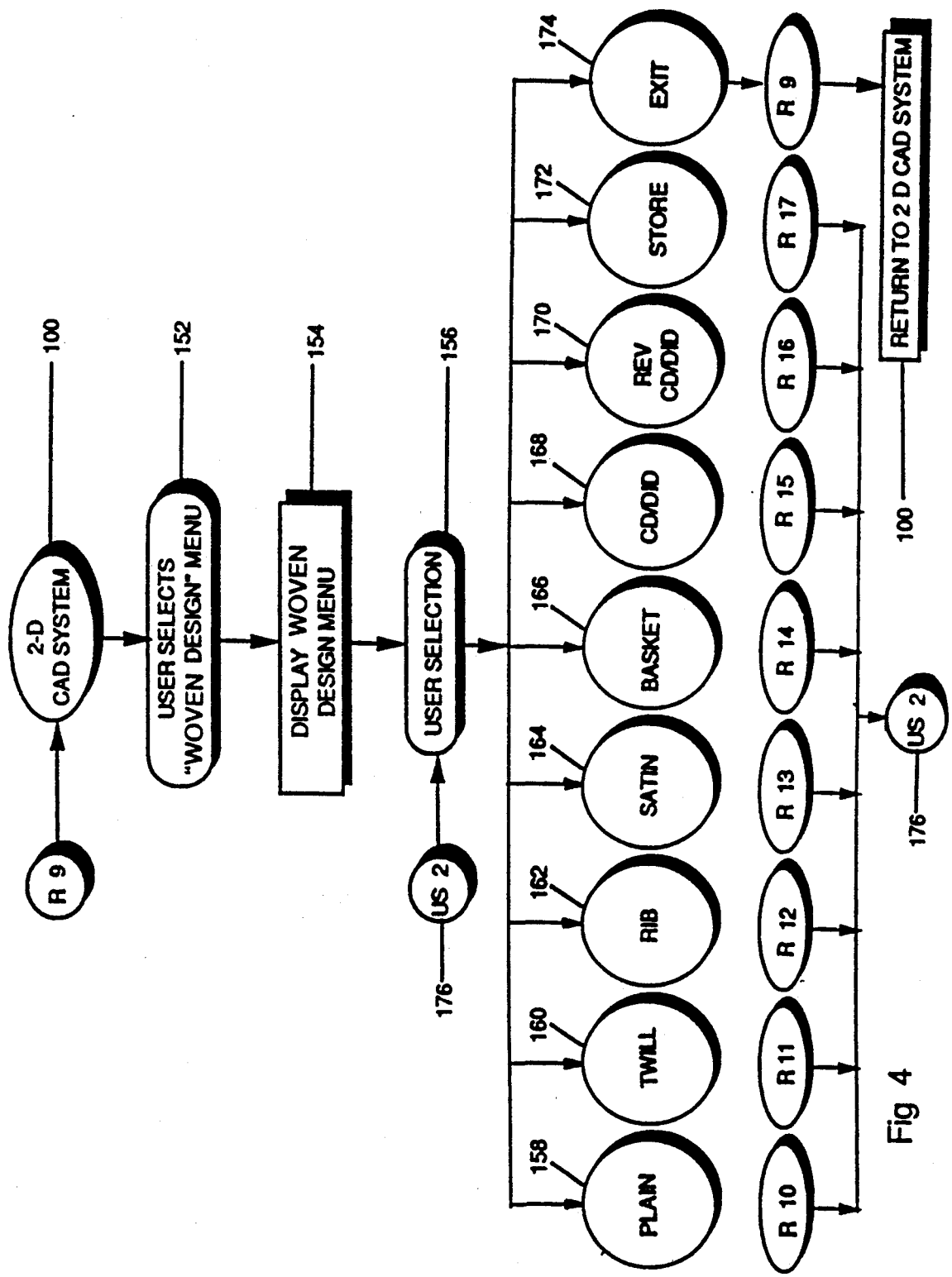
FIG. 4 is a flow chart illustrating the woven design function of the present invention.

FIG. 4 illustrates the flow chart for the "woven design" function which allows the user to develop a weave from known weave patterns, develop a pattern from scratch by specifying the "chain-draft" and "drawing-in-draft" sequences or by simulating a grid on a weave pattern and using the reverse CD/DID function to determine the optimum CD/DID and the CD/DID function to modify the design, from a menu displayed on the screen. The function, as a whole, is invoked from the exits to standard two-dimensional CAD software 100 and allows the user to select (152, 154, 156) from a menu of individual sub-functions 158-172 plus an "exit" function 174. Each of the sub-functions 158-172 executes some part of the "woven design" function and once each of these sub-functions finishes its task, control is returned to the woven design function illustrated in FIG. 4, indicated by labels R10-R17. Control is then passed back to the menu selection (US2) 176 so that the user may proceed to the next function.

Figure 5:
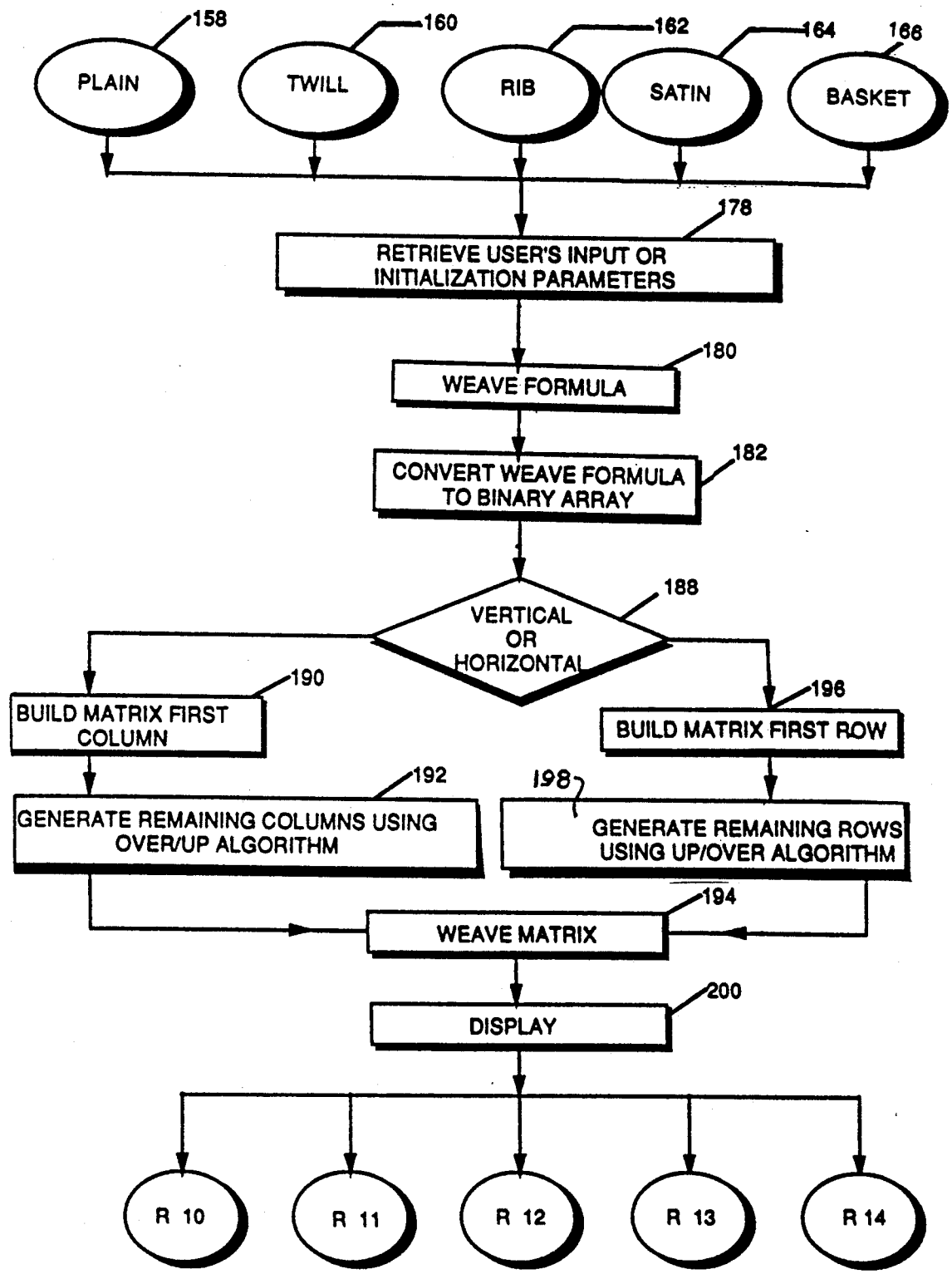
FIG. 5 is a flow chart illustrating the woven design from the basic weaves function of the present invention.

FIG. 5 illustrates the flow chart for generating weave design from basic weaves. When the user wishes to design a weave using a basic weave the user selects the "plain" weave function 158, the "twill" weave function 160, the "rib" weave function 162, the "satin" weave function 164 or the "basket" weave function 166. For each of the specified basic weaves, many of the parameters are predefined and stored in the system by initialization. When one of the basic weave functions 158 through 166 is invoked, the user is prompted at 178 to provide parameters that are required by the system to effect a weave design in the specified basic weave function.

The user does not provide a parameter for plain weave since all of the data required is initialized into the system. To create a twill, the user must specify a desired twill angle and weave formula. The system will determine the layout and up/over or over/up. To create a rib weave, the user must enter a formula for the rib weave and the system derives the remaining parameters. Likewise, in a satin or basket weave, the user specifies the formula and the layout and up/over or over/up are initialized in the system.

The function retrieves the weave formula (180) which is converted at 182 into a single dimension binary array. The function then determines at 188, based on initialized standards, whether the selected basic weave is vertically directed or horizontally directed. If the basic weave is vertically directed, the first column of the weave matrix is built at 190 and the remaining columns are generated at 192 using the over/up algorithm for that pattern. If it is determined at 188 that the particular pattern is horizontally directed, the first row of the weave matrix is built at 196 and the remaining rows generated at 198 using the up/over algorithm. With the weave matrix fully assembled (194) it is displayed (200) on CRT 44. A steering program directs control to R10 through R14 and back to the menu selection (US2) 174 so that the user may proceed to the next function.

The CD/DID function is provided to allow the user to design a weave other than one of the five basic weaves. This function allows the user to manipulate the "chain-draft" (CD), a sequence of lifting harnesses and the "drawing-in-draft" (DID), a sequence of drawing warp threads through harnesses. A woven fabric, which is formed by interlacing two sets of threads or yarns, may be represented in diagram form with a binary representation for vertical threads passing over horizontal threads and the opposite condition. It is also known that weave chain-draft and drawing-in-draft may be represented by binary matrices representing multiplication of the chain-draft (CD) and the drawing-in-draft (DID). As will be explained in more detail below, the present invention utilizes the matrix attributes of a weave pattern to compress the data necessary to specify the weave pattern in a bitwise operation prior to storage in system memory to conserve memory space. It has been discovered that the compression function, in addition to conserving memory, speeds the execution of the program.

Figure 6:
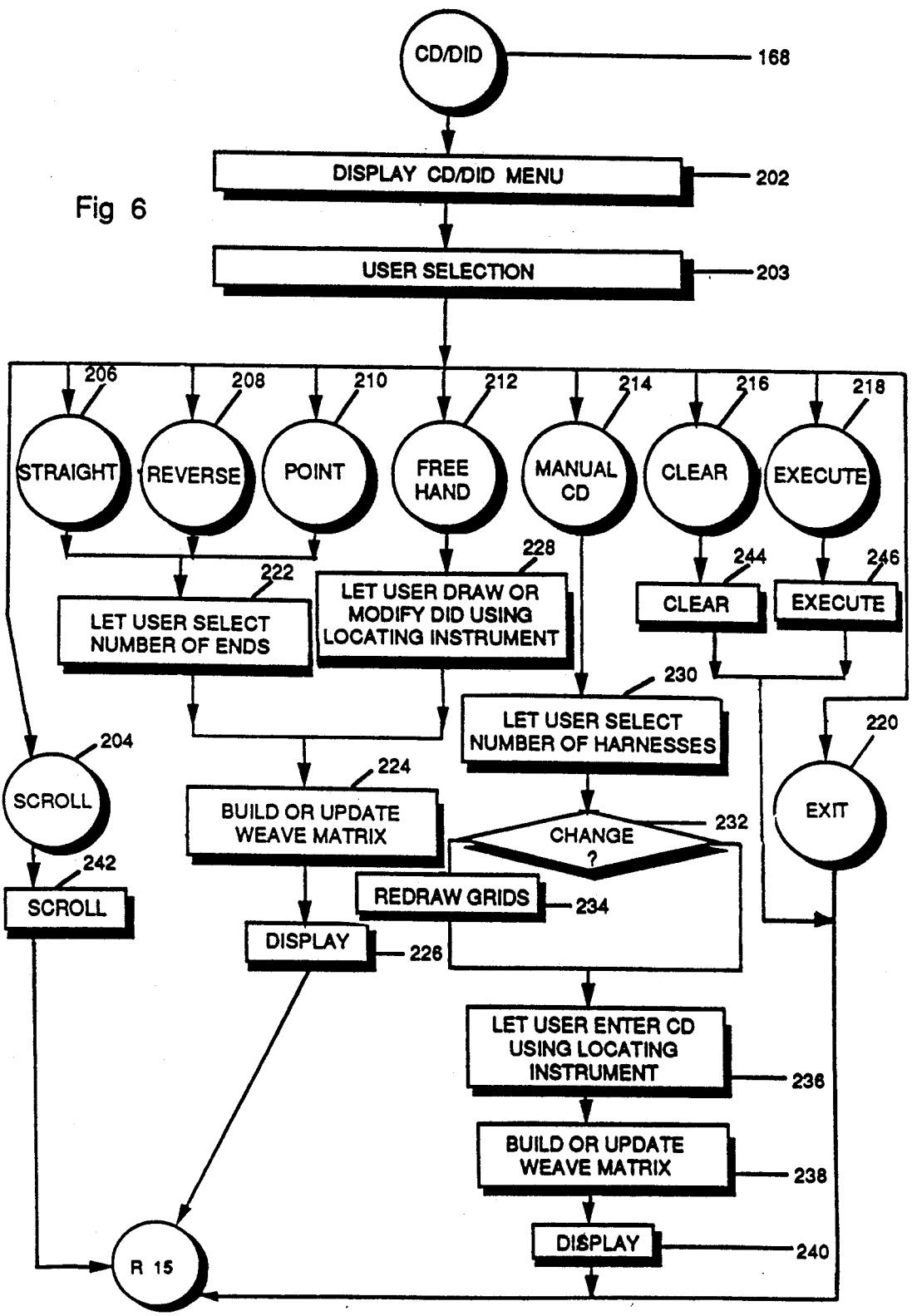
FIG. 6 is a flow chart illustrating the woven design from the CD/DID function of the present invention.

The flow chart for the CD/DID function is illustrated in FIG. 6. When the user selects (168) the CD/DID function, a menu is displayed on the screen providing the following choices:

Straight
Reverse
Point
Free Hand
Clear
Execute
Manual CD

When the user selects the "Straight" function 206, the "Reverse" function 208 or the "Point" function 210, the system lets the user (222) specify the number of ends planned for the warp-end-to-harness drawing sequence. A response to the message displays the corresponding portion of DID automatically and the system builds or updates at 224 the weave matrix which is displayed (226) on CRT 44. The user may then select (202, 203) another CD/DID function. If the user selects the "Free Hand" function 212, the system initiates a free hand drawing routine which allows the user (228) to draw or modify a DID on the screen using a locating instrument, such as light pen 38 or mouse 36. The system then builds or updates (224) the weave matrix and displays (226) the result on CRT 44. When the user selects the "Manual CD" function 214, the system lets the user (230) select or modify the number of harnesses in the CD. If this represents a change (232) the system redraws the grids at 234 and lets the user (236) enter the CD using a locating instrument. The system then builds or updates (238) the weaver matrix which is displayed at 240 on CRT 44.

The CD/DID function 168 additionally provides a "Clear" function 216 to clear the CD or DID at 244 and an "Execute" function 218 to execute (246) the CD/DID function. A "scroll" function 204 will laterally or vertically adjust the displayed portion of the pattern on the screen.

Figure 23:
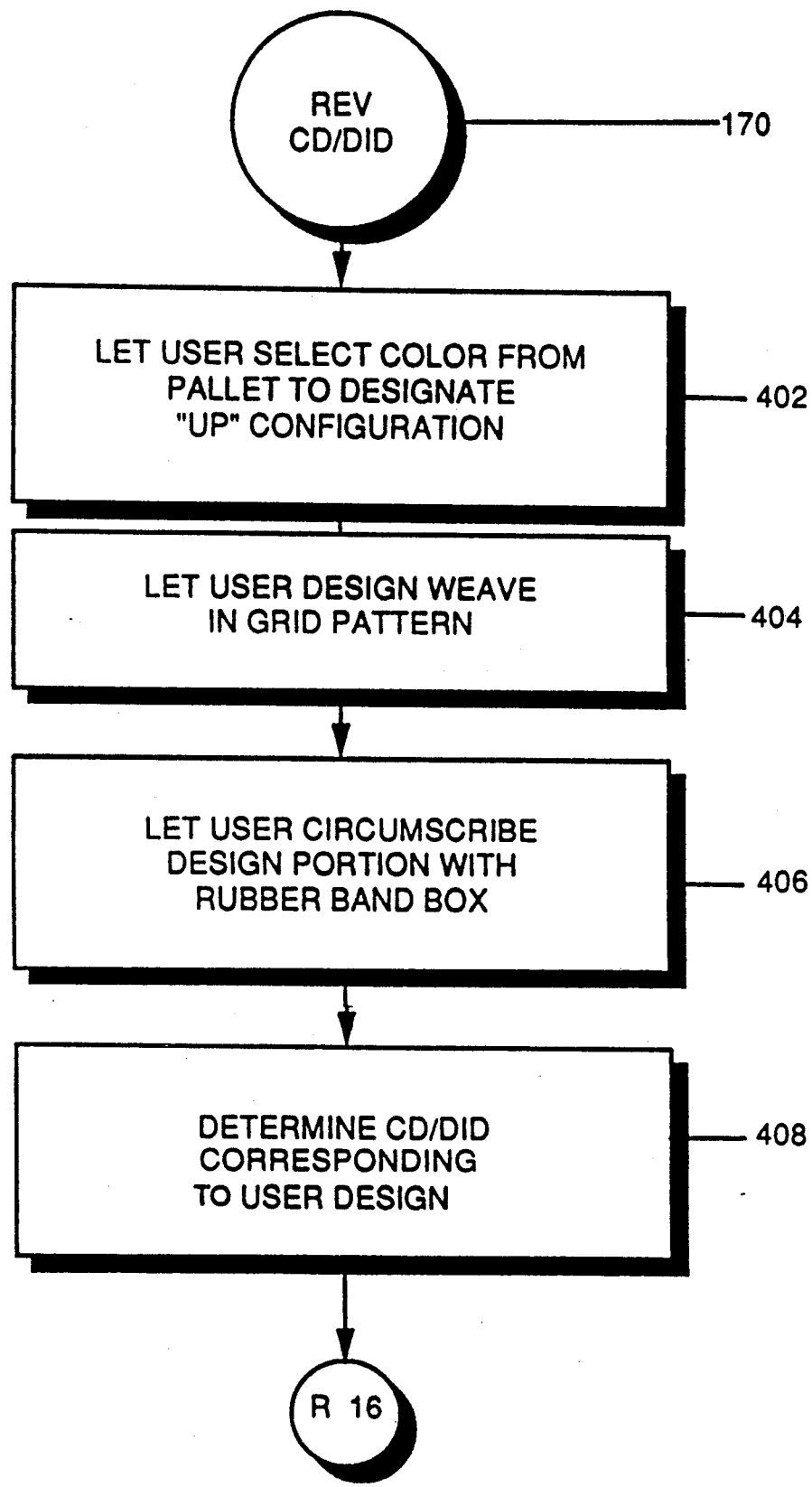
FIG. 23 is a flow chart illustrating the "reverse CD/DID" function of the present invention.

The woven design function includes a reverse CD/DID function 168 (FIG. 4) which provides a tool for the user to create a woven pattern design and determine the optimum DID and CD for that design. The flow chart for the reverse CD/DID function 170 is illustrated in FIG. 23. The function lets the user select a color from the system color palette to designate the "up" configuration at 402 and to design (404) the weave in the grid pattern. At 406, the user utilizes the software "rubber band box" to outline, and thereby designate, the portion of the free hand design for which it is desired to have the DID and CD determined. The system determines at 408 the optimum CD/DID corresponding to the user design. The algorithm for determining an optimum CD/DID from a weave matrix is known in the art and is disclosed in Lourie, Janice R. "Textile Graphic/Computer-Aided" (1973), Chapter 9, pp. 171-188, which is incorporated herein by reference.

Figures 7, 9:
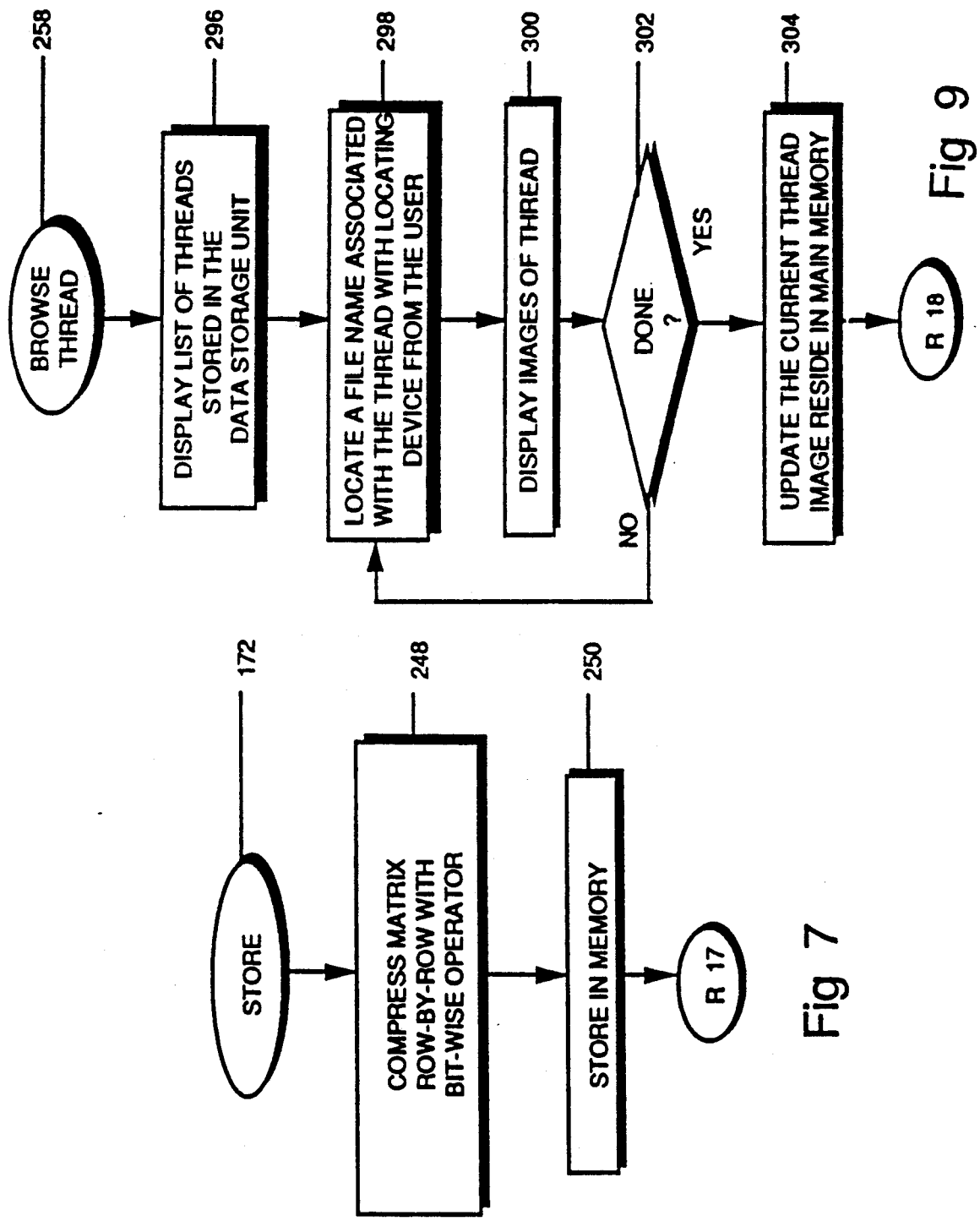
FIG. 7 is a flow chart illustrating the "store" function of the present invention.
FIG. 9 is a flow chart illustrating the "browse thread" function of the present invention.

The woven design function additionally provides a "store" function 172, illustrated in FIG. 7, to store in memory, patterns developed by the weave design function. Referring to FIG. 7, the function compresses (248) the weave pattern matrix row-by-row using a bitwise operator. The system makes use of the fact that the weave matrix is binary to store the matrix as individual bits rather than as integers or bytes. In this manner, every bit of each byte is utilized and a four-fold compression is realized. The compressed matrix is stored (250) in the system's memory for subsequent retrieval.

Figure 8:
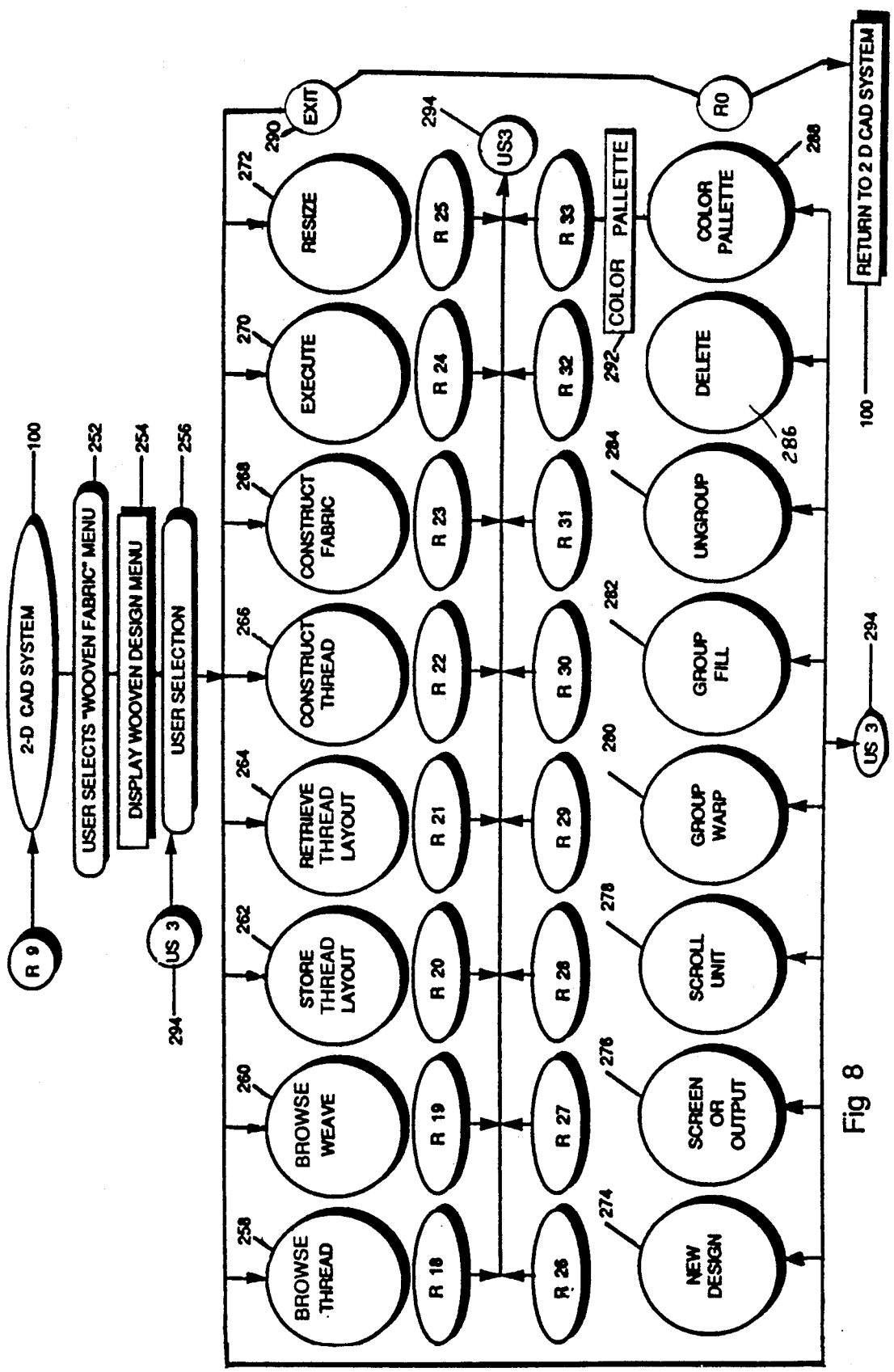
FIG. 8 is a flow chart illustrating the woven fabric function of the present invention.

FIG. 8 illustrates the main flow chart for the "woven fabric" function and outlines a function that allows the user to design and display the surface image of a woven fabric. The function as a whole is invoked from the exits to CAD system 100 and allows the user to select (252, 254, 256) from a menu of individual sub-functions 258 to 288 plus an "exit" function 290. Each of the sub-functions 258 to 288 execute some part of the woven fabric design function and, once each of the sub-functions finishes its task, control is returned to the woven fabric function illustrated in FIG. 8, indicated by labels R18 through R33. Control is then passed back to the menu selection (US3) 294 so that the user may proceed to the next function. The woven fabric function additionally displays on CRT 44 a set of warp threads vertically, and a set of filling threads horizontally, on the display. A default warp and filling thread layout and weave are initialized in the system. Additionally, the system will display the most recent weave pattern and thread selections previously made by the user. The woven fabric design function allows the user to select a color from the color palette to tint the warp and filling layout, browse the yarn and weave library and select one for use. A "construct fabric" function allows the user to specify the ends-per-inch (EPI) and picks-per-inch (PPI), with the system computing the ratio of EPI and PPI to establish the appropriate spacing between the warp ends and filling picks. Group warp and group fill functions provide tools for easily grouping warp and fill threads having the same thread design to assist in designing plaids and the like. The woven fabric function is sensitive to the yarn size selected by the user which may be specified during the "browse thread" function.

After the user has specified the parameters of interest, with the remaining parameters specified by initialized default values, an "execute" function is invoked to construct the fabric design. If the user wishes to make a change in the fabric design, the various parameters may be modified and the "execute" function again invoked. Once the user is satisfied with a design, it may be stored in memory for subsequent retrieval.

The flow chart for the "browse thread" function 258 is illustrated in FIG. 9. When this function is invoked, it displays (296) a list of the threads stored in the data storage unit and allows the user (298) to select a thread, including thread size, which will be retrieved. The image of the retrieved thread is displayed (300) and the function determines at 302 whether the user desires to make an additional selection. The system stores at 304 the most recently accessed thread as a default thread in subsequent fabric designs.

Figure 10:
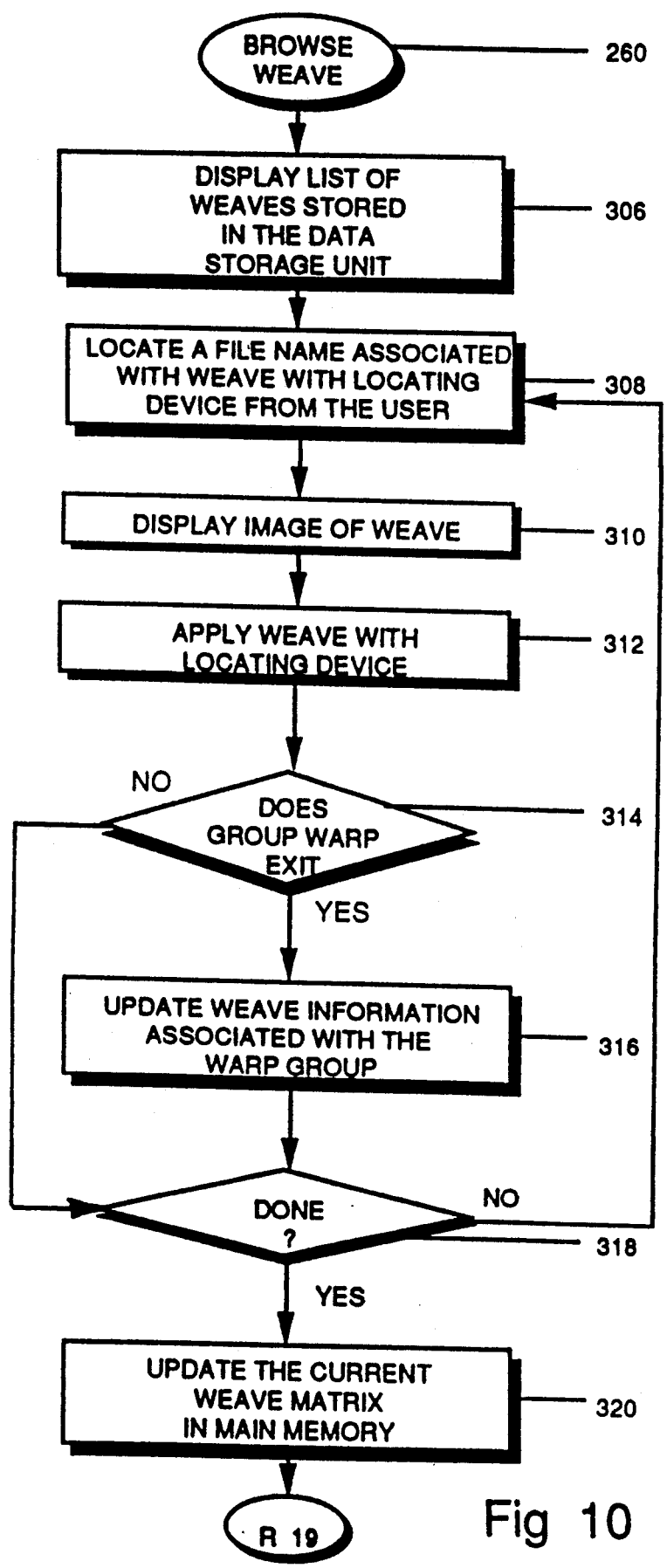
FIG. 10 is a flow chart illustrating the "browse weave" function of the present invention.

FIG. 10 illustrates the "browse weave" function 260 which, when invoked, displays a list (306) of the weaves stored in the data storage unit. The function allows the user to designate (308) a weave with a locating device. The system locates the file associated with the selected weave and displays (310) the image of the weave on CRT 44. The function allows the user to apply (312) the retrieved weave to the desired portion of the fabric layout to accommodate more than one weave design in a particular fabric. The system then determines at 314 whether a group warp function is in existence and, if so, updates the weave information associated with the existing warp group at 316. The function then determines at 318 if the user desires to browse further and if not, a current weave portion of memory is updated at 320.

Figure 12:
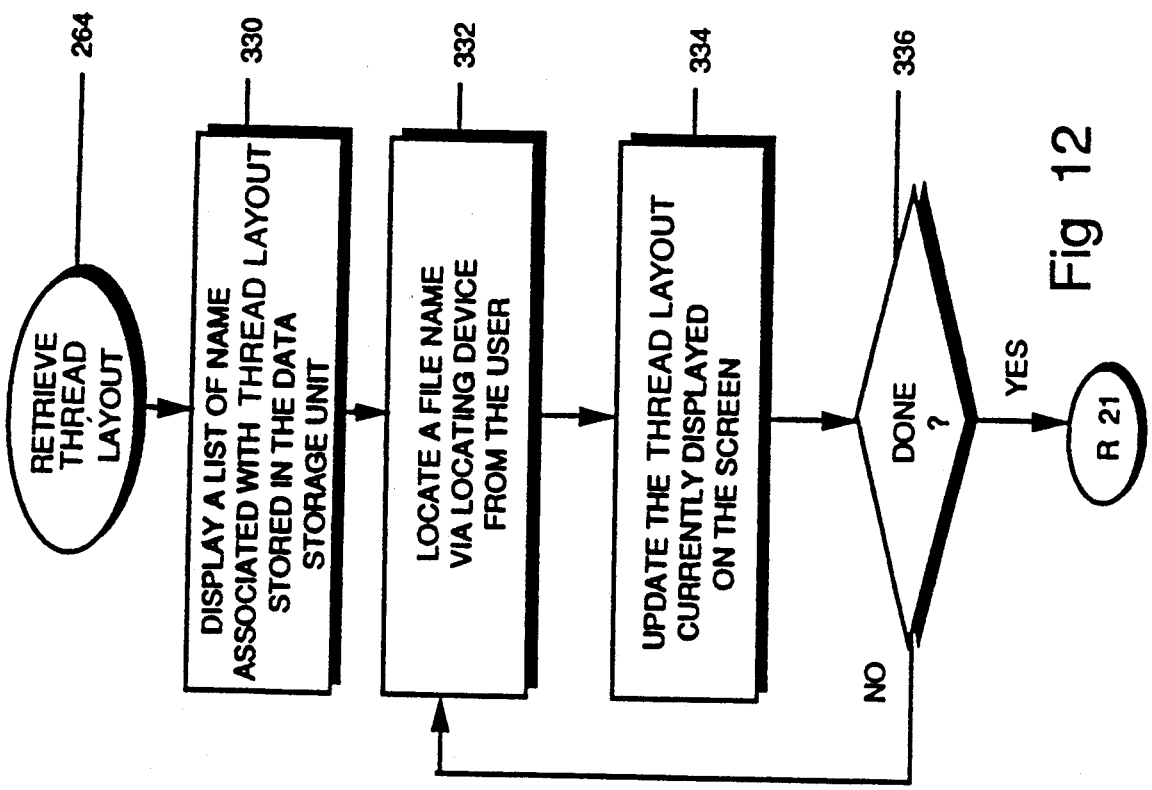
FIG. 12 is a flow chart illustrating the "retrieve fabric layout" function of the present invention.
Figure 11:
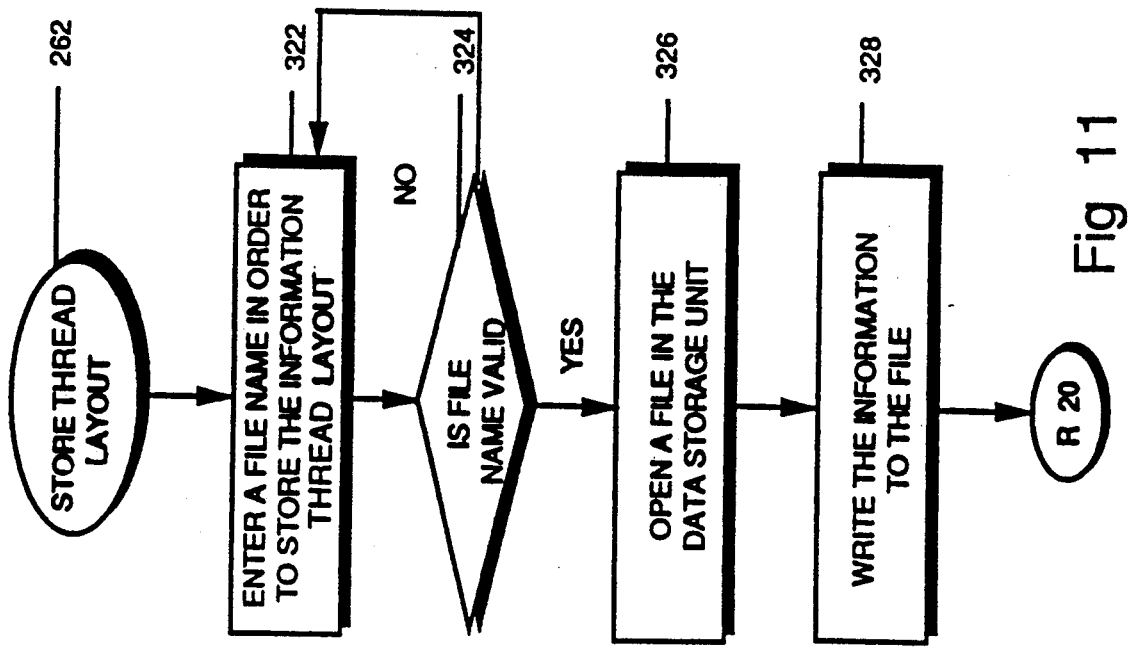
FIG. 11 is a flow chart illustrating the "store fabric layout" function of the present invention.

The flow chart for the "store thread layout" 262 is illustrated in FIG. 11. When this function is invoked, a file name is constructed at 322 and a file opened at 326. The thread layout is written into the file at 328. Stored thread layouts are retrieved by the "retrieve thread layout" function 264, whose flow chart is illustrated in FIG. 12. When this function is invoked, a list of names is displayed (330) and the user is requested to select a file name with a locating device at 332. The system updates (334) the thread layout presently displayed on the screen and the system determines at 336 if the user desires to retrieve an additional thread layout.

The "construct thread" function 266, whose flow chart is illustrated in FIG. 13, allows the user to construct a thread having a repeat pattern along its length that may be established up to a five-inch pattern. When this function is invoked, the user is requested to enter the parameters at 338 for the repeat pattern and the function updates the thread definition for the fabric design. The updated fabric design is displayed in the screen at 342 and it is determined at 344 whether the user wishes to make additional parameter selections.

The "construct fabric" function 268, whose flow chart is illustrated in FIG. 14, requests the user to select the ends-per-inch (EPI) and picks-per-inch (PPI) at 346 of the fabric. The system computes at 348 the ratio of the selected EPI and PPI to proportion the space between the fabric threads. This provides the proper spacing between the woven fabric threads which provides a real-life dimension to the fabric image. The function updates (350) the display of the thread layout and determines at 352 whether the user desires to enter additional parameters.

Figures 15, 16:
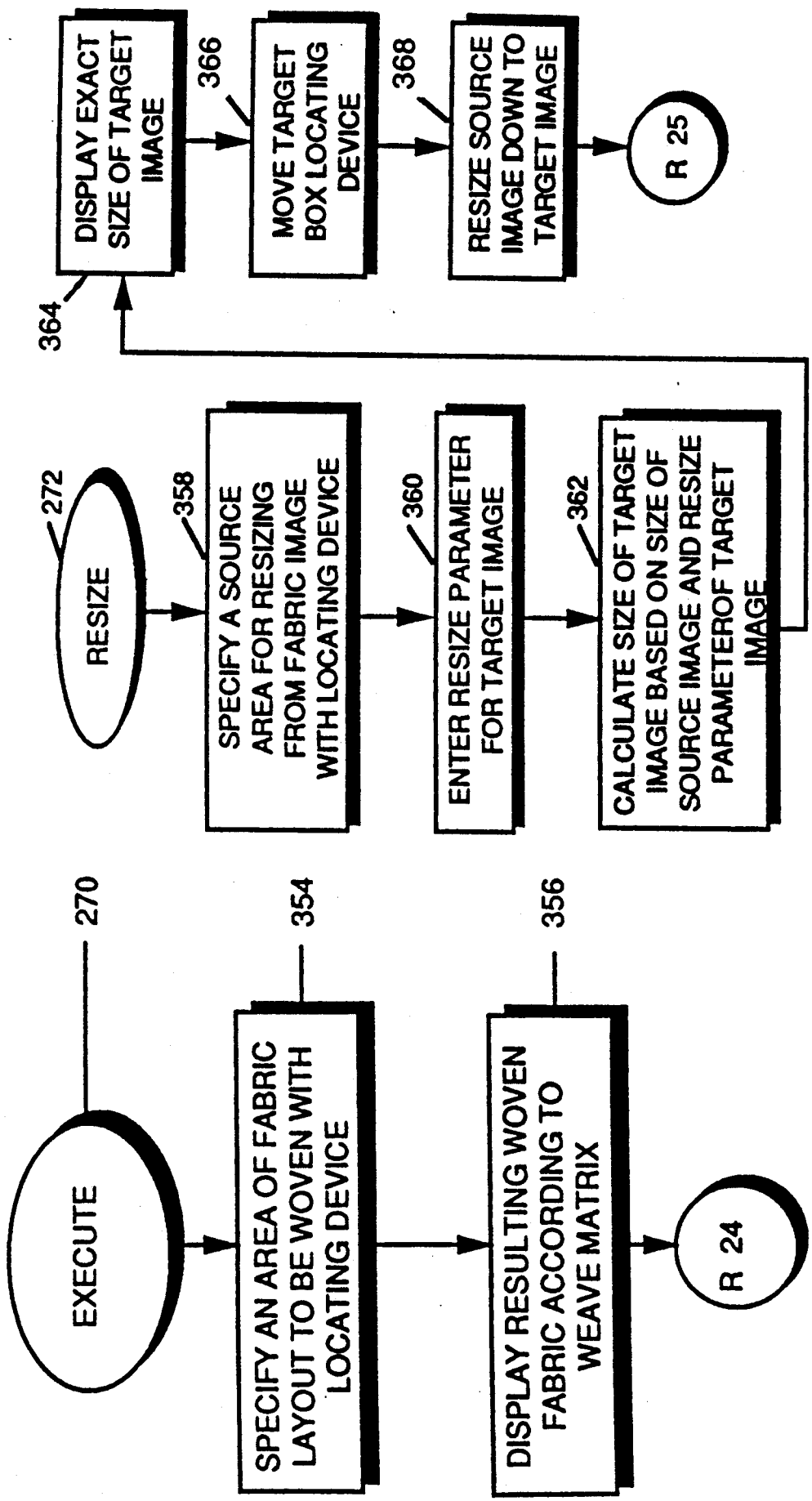
FIG. 15 is a flow chart illustrating the "execute" function of the present invention.
FIG. 16 is a flow chart illustrating the "resize" function of the present invention.

The "execute" function 270, whose flow chart is illustrated in FIG. 15, provides a simulated multiple weave by allowing the user to select (354) with a locating device such as a "rubber band box" manipulated by mouse 36 or light pen 38, an area of the fabric layout to be woven with the weave design selected in the "browse weave" function or by a default weave. The function displays at 356 the woven fabric image.

Operation of the "execute" function 270 is illustrated in FIG. 24. The woven fabric image is created from the weave matrix and thread size, which may be one-pixel, two-pixel or three-pixel for the warp and fill threads. Each element in the weave matrix represents either a warp thread crossing over a fill thread (1) or under a fill thread (0) and is represented in the fabric image by a three-pixel by three-pixel box.

The creation of a fabric image from one-pixel warp and fill threads and having the weave matrix illustrated in FIG. 24(g) is illustrated in FIGS. 24a and b. In FIG. 24a, the red (R) warp threads are laid out with the areas 450 and 452 representing the warp threads "up", or over the fill thread, which corresponds to 1's in the weave matrix. Areas 450 and 452 are each one pixel wide and are full-colored. Areas 454 and 456 represent the warp threads "down", or under the fill thread, which corresponds to 0's in the weave matrix. Areas 454 and 456 are "shaded" which means they are provided the thread color or image of the warp thread but at seventy percent (70%) of the intensity of areas 450 and 452.

In FIG. 24b, the white (W) fill threads are "woven" with the warp threads. The fill threads are "up", or over the warp threads, at areas 458 and 460 which are one pixel wide and fully colored. Because the fill threads are up at 458 and 460, the intersecting portions of areas 454 and 456 of the warp threads are dominated and thus eliminated. However, portions of areas 454 and 456 extend from opposite sides of fill thread areas 458 and 460 as shaded warp thread portions. Areas 462 and 464 which are "down", or under portions of the fill threads, are shaded and dominated by warp thread areas 450 and 452 at their intersections. The remaining areas of the image are provided a background color, such as black.

The creation of a fabric image from two-pixel warp and fill threads having the weave matrix in FIG. 24(g) is illustrated in FIGS. 24(c) and (d). In FIG. 24(c), the red warp threads are laid out as full colored areas 464 and 466, where the warp threads are up, and shaded areas 468 and 470, where the warp threads are down. When the white fill threads are added in FIG. 24(d), full colored areas 472 and 474 dominate the down fill threads. However, portions of shaded areas 468 and 470 of the warp threads and 476 and 478 of the fill threads remain. The rest of the image is colored with black background color.

The creation of a fiber image from three-pixel warp and fill threads with the FIG. 24(g) weave matrix is illustrated in FIGS. 24(e) and (f). Although the red warp threads are laid out with shaded areas 480 and 482 where the fill thread is down, these areas are fully covered by up areas 484 and 486 of the white fill threads and do not appear in the final image of the fabric. Thus, with three-pixel warp and fill threads, the final image does not include shaded areas or background areas. The above illustrated creation of the woven cloth, will apply equally well with a mixture of warp and fill threads of different diameters. For example, a one-pixel warp thread may be combined with a two-pixel fill thread.

The "resize" function 272, whose flow chart is illustrated in FIG. 16, allows the user to specify (358) with a locating device, an area to be resized and to enter (360) a parameter for resizing the image. The system then calculates at 362 the size of the target image based on the size of the source image and resize parameter of the target image. The function displays (364) the size of the target image and allows the user to move (366) the target box with a locating device. The system then resizes at 368 the source image to the target image.

Figure 18:
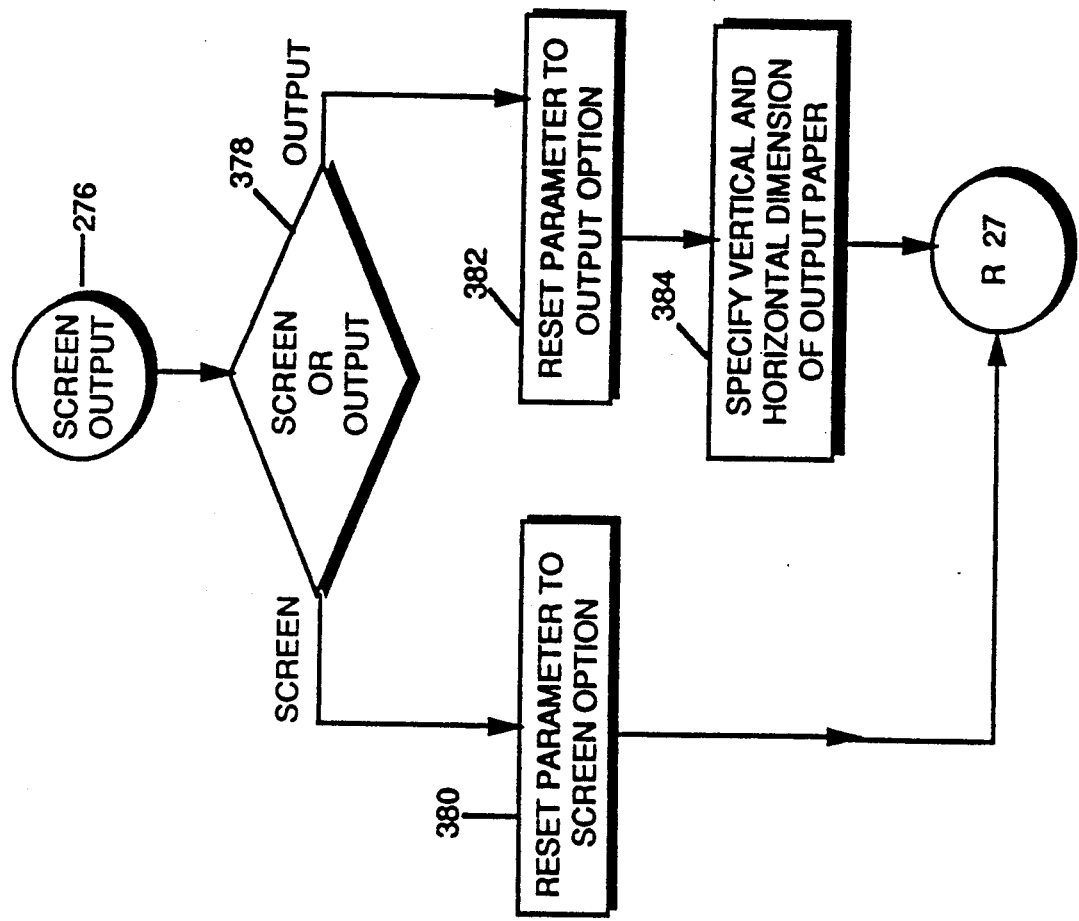
FIG. 18 is a flow chart illustrating the "screen/output" function of the present invention.
Figure 17:
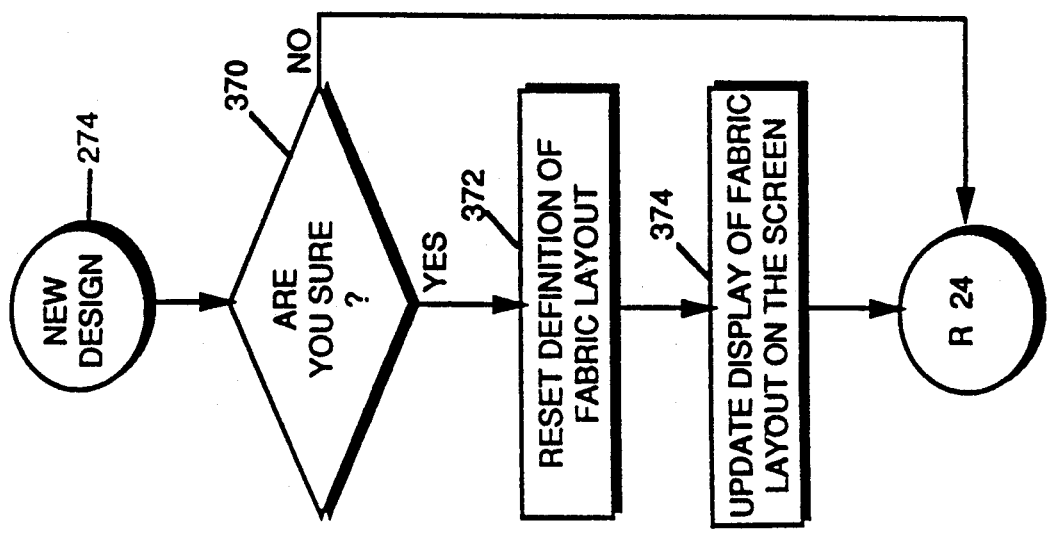
FIG. 17 is a flow chart illustrating the "new design" function of the present invention.
Figure 19:
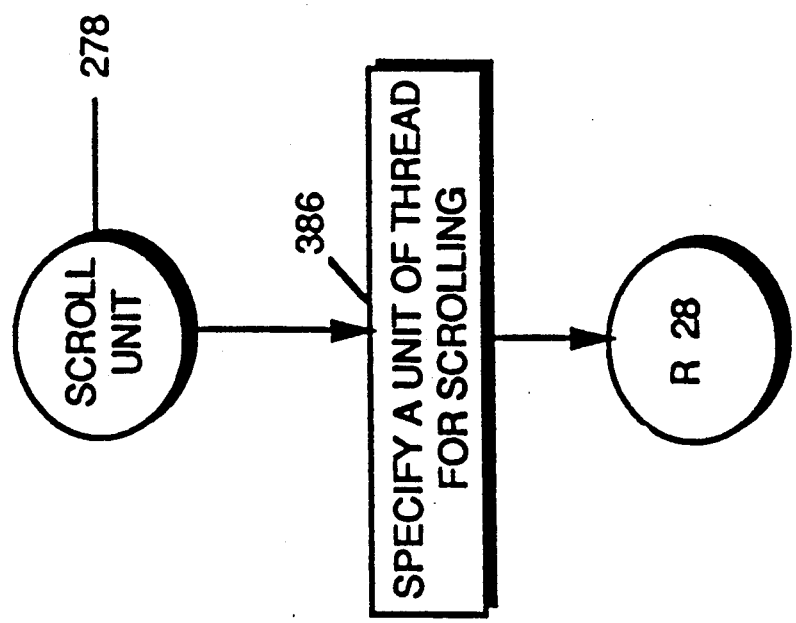
FIG. 19 is a flow chart illustrating the "scroll unit" function of the present invention.

The "new design" function 274, whose flow chart is illustrated in FIG. 17, allows the user to replace the current fabric layout with the default layout in order to initiate a new design. The "screen/output" function 276 illustrated in FIG. 18 provides a built-in length measuring device which may be used by the user in assigning threads and applying colors to the fabric layout. The user may specify at 378 whether to base the measurement unit on "screen pixels" or the dimensions of an "output device". If the "screen" is selected, the function resets the parameters (380) to those of the screen. If the "output" is selected the system resets the parameters at 382 to the output option which requires the user to specify (384) the vertical and horizontal dimensions of the output paper. The "scroll unit" illustrated in FIG. 19, allows the user to specify at 386 the unit of threads to be applied to the scrolling movement.

Figure 20:
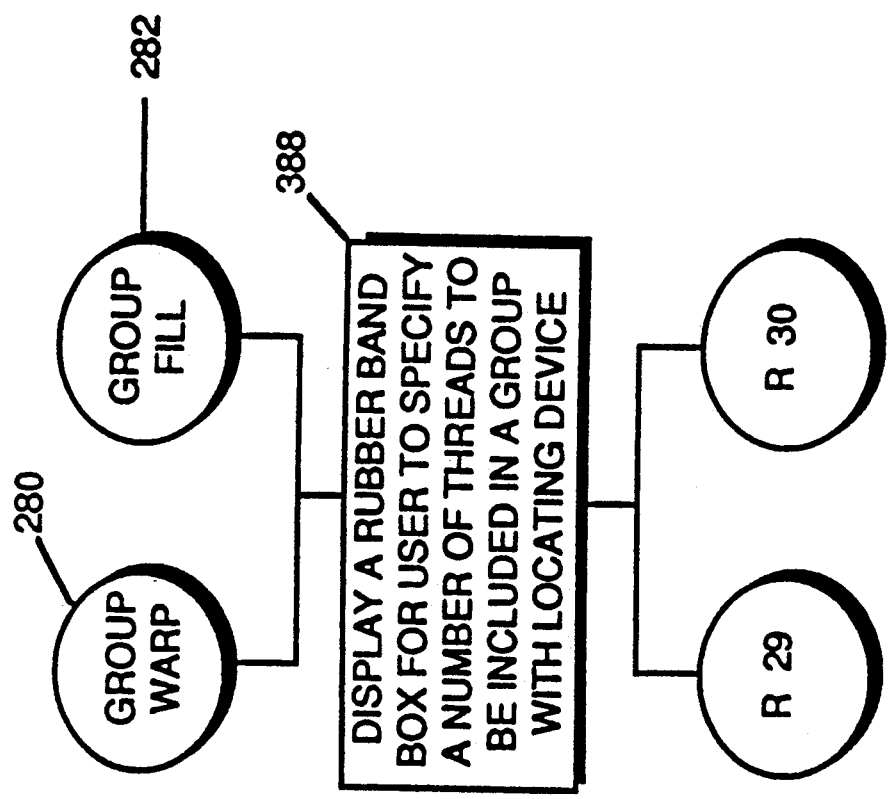
FIG. 20 is a flow chart illustrating the "group warp" and "group fill" functions of the present invention.
Figure 22:
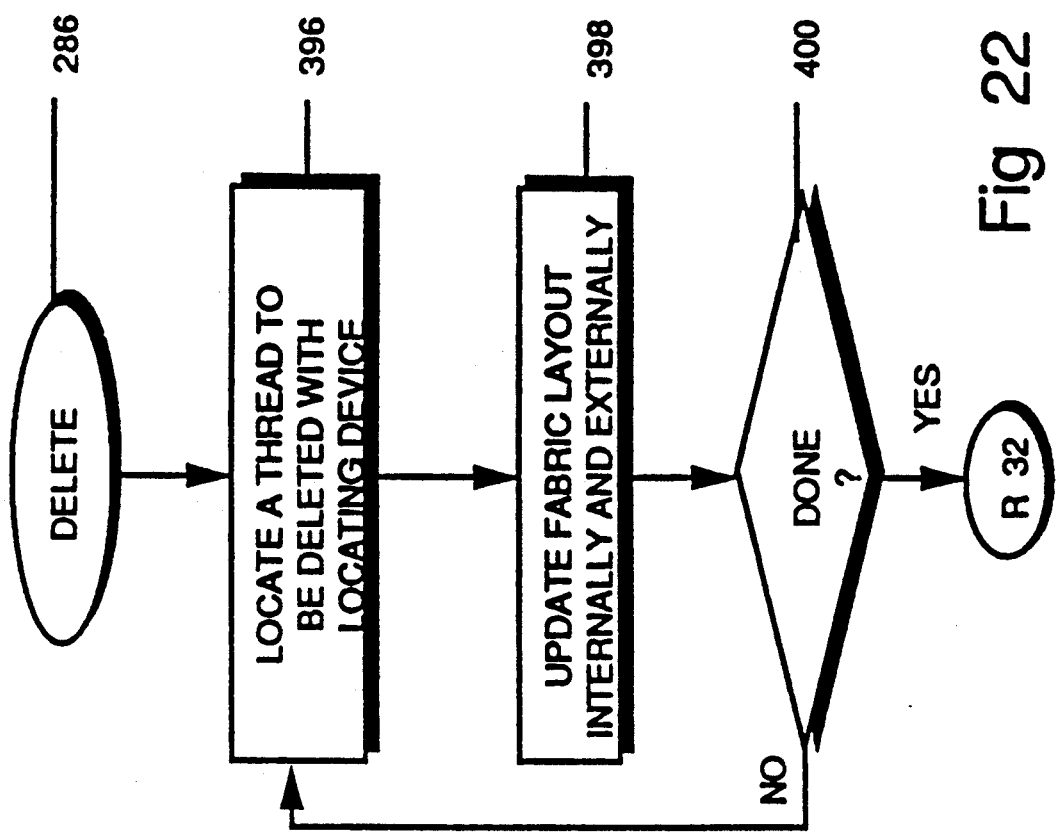
FIG. 22 is a flow chart illustrating the "delete" function of the present invention.
Figure 21:
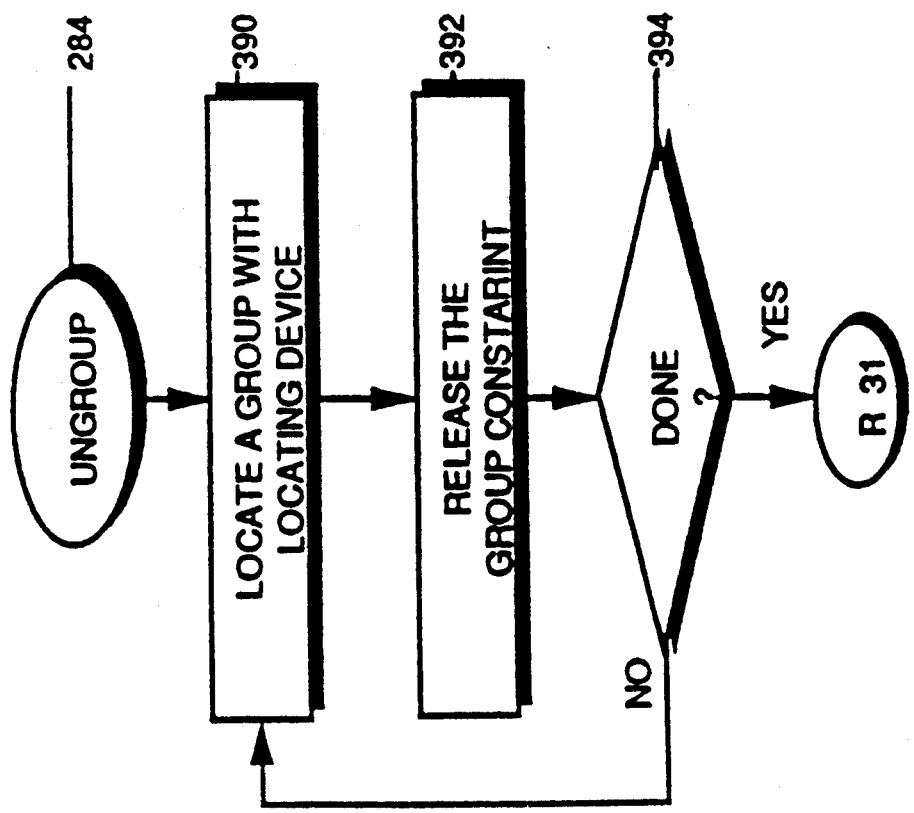
FIG. 21 is a flow chart illustrating the "ungroup" function of the present invention.

The "group warp" function 280 and "group fill" function 282 are illustrated in FIG. 20. When one of these two functions is selected, a "rubber band box" is imaged (388) on the display and the user is allowed to configure the box to include the threads selected for the particular grouping. The "ungroup" function 284, whose flow chart is illustrated in FIG. 21 allows the user to release at 392 the grouping defined by locating device at 390. The "delete" function 286 illustrated in FIG. 22 allows the user to locate (396) a thread to be deleted and updates at 398 the fabric layout with the thread deleted. As the thread is deleted, the remaining threads are shifted and default threads added at the end of the pattern.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows.

1. In a computer-assisted design system having data storage memory, a display device for displaying an image corresponding to a data set in said memory and a logic control system for manipulating data, a method for generating an image or a textile article comprising:
establishing with said control system a two-dimensional data set in said memory representative of an image of a lateral cross section of a bundle of fibers;
transforming said data set with said control system in a manner that will project said image of a lateral cross section along an axis perpendicular to said image of said cross section in order to generate a second two-dimensional data set in said memory representative of a first image of a longitudinal side of a yarn including said bundle of fibers;

scaling said second two-dimensional data set with said control system to create a third data set representative of a second image of a longitudinal side of a yarn having a diameter smaller than said first image; and displaying with said control system said first and second images of longitudinal sides of said yarns on said display device.

2. The method for generating an image of a textile article in claim 1 in which said step of transforming includes transforming said two-dimensional data set with said control system in a manner that will rotate said image of said cross section about said axis.

3. The method for generating an image of a textile article in claim 2 in which said step of transforming includes transforming said two-dimensional data set in a manner that will rotate said image of said cross section at a constant rate.

4. The method for generating an image of a textile article in claim 2 in which said step of transforming includes transforming said two-dimensional data set in a manner that will rotate said image of said cross section at a random rate.

5. The method for generating an image of a textile article in claim 1 in which said step of establishing includes receiving a user input of fiber arrangement and converting said user input with said control system to said two-dimensional data set according to a function that is dependent on the radial spacing from the center of each fiber.

6. The method for generating an image of a textile article in claim 5 wherein said function establishes the intensity of shading of a portion of each fiber increasing in proportion to the distance of said portion from said center of said fiber.

7. The method for generating an image of a textile article in claim 1 including scaling said second two-dimensional data set to create fourth and fifth data sets representative of third and fourth images of longitudinal sides of third and fourth yarns respectively having diameter smaller than said first and second images of longitudinal sides.

8. In a computer-assisted design system having a data storage memory, a display device for displaying an image corresponding to a data set in said memory and a logic control system for manipulating data, a method for generating an image of a textile article comprising:

establishing with said control system a first two-dimensional data set in said memory representative of a lateral cross-sectional image of a bundle of fibers, such that each of said fibers has a color hue value and a plurality of portions, each of said portions having a shading value, the shading value of each of said portions being dependent on the radial spacing of that portion from the center of the associated fiber;

transforming said first two-dimensional data set with said control system in a manner that will project said cross-sectional image along an axis perpendicular to said cross-sectional image to generate a second two-dimensional data set in said memory representative of a longitudinal image of a yarn including said bundle of fibers; and displaying with said control system said longitudinal image of a yarn on said display device.

9. The method for generating an image of a textile article in claim 8 in which said steps of transforming includes transforming said first two-dimensional data set with said control system in a manner that will rotate said cross-sectional image about said axis.

10. The method for generating an image of a textile article in claim 9 in which said step of transforming includes transforming said first two-dimensional data set in a manner that will rotate said cross-sectional image at a constant rate.

11. The method for generating an image of a textile article in claim 9 in which said step of transforming includes transforming said first two-dimensional data set in a manner that will rotate said cross-sectional image at a random rate.

12. The method for generating an image of a textile article in claim 8 further including scaling said second two-dimensional data set with said control system to create a third two-dimensional data set representative of a second longitudinal image of a yarn having a diameter smaller than said longitudinal image of a yarn.

13. The method for generating an image of a textile article in claim 12 further including establishing with said control system a fourth data set in said memory representative of another longitudinal image of a yarn and a fifth data set in said memory representative of a weave matrix including parameters for generating a woven fabric, combining with said control system one of said second and third data sets with said fourth data set according to said fifth data set to produce a sixth data set representative of a woven fabric image and displaying with said control system said sixth data set as a woven fabric image on said display device.

14. The method for generating an image of a textile article in claim 8 further including establishing with said control system a second data set representative of a second longitudinal image of a yarn and a third data set representative of a weave matrix including parameters for generating a woven fabric, combining with said control system said first and second data sets according to said third data set to produce a fourth data set representative of a woven fabric image and displaying with said control system said fourth data set as a woven fabric image on said display device.

15. The method for generating an image of a textile article in claim 14 including applying shading with said control system to portions of said longitudinal images of yarns according to a function that is dependent on the position of each of said portions within said weave matrix.

16. In a computer-assisted design system having a data storage memory, a display device for displaying an image corresponding to a data set in said memory and a logic control system for manipulating data, a method for generating an image of a textile article comprising:

providing in said memory a first data set representative of a first yarn;

providing in said memory a second data set representative of a second yarn;

providing in said memory a third data set representative of a weave matrix including parameters for generating a woven fabric;

combining with said control system said first and second data sets according to said third data set to produce a fourth data set representative of a woven fabric image having shading at portions of yarns in said image according to a function that is dependent on parameters of an element in the weave matrix that corresponds to the one of said portions; and displaying with said control system said woven fabric image on said display device.

17. The method for generating an image of a textile article in claim 16 in which said step of providing a third data set includes establishing in said memory a plurality of basic weave designs having a predetermined weave formulae, receiving with said control system a user selection of a basic weave design, obtaining with said control system user parameters required to establish a portion of said third data set for a selected weave design and generating with said control system the remaining portion of said third data set from the weave formula for the weave design selected by the user.

18. The method for generating an image of a textile article in claim 16 in which said weave matrix is in integer form and said step of providing a third data set includes converting the integer values of said weave matrix to binary values to effect compression of data.

19. The method for generating an image of a textile article in claim 16 in which said step of providing a third data set includes receiving a user input of a desired weave pattern and calculating the optimum CD/DID for the user inputted pattern.

20. The method for generating an image of a textile article in claim 16 in which said third data set includes a plurality of weave matrices and parameters for combining said matrices into a fabric.

21. The method for generating an image of a textile article in claim 16 in which said step of providing a third data set includes grouping individual yarns together in said image such that said grouped yarns will include the same color parameters.

22. A computer-assisted design system apparatus for generating an image of a textile article comprising:
input means for receiving a user selection of fiber arrangement in a lateral cross section of a yarn;
yarn image generating means for generating a longitudinal image of yarn in response to said input means;
weave matrix data storage means for storing parameters sufficient to specify a weave pattern; and
woven fabric image generating means for applying a set of weave pattern parameters to said yarn image generating means to generate an image of a fabric woven according to a weave pattern utilizing a yarn image generated from a user selection to said input means.

23. The apparatus for generating an image of a textile article in claim 22 in which said yarn image generating means includes fiber shading means for shading portions of the image of each of said fibers selected by a user, said shading means includes means responsive to the position of each of said portions within a fiber for varying the amount of shading applied to each of said portions.

24. The apparatus for generating an image of a textile article in claim 23 in which said fiber shading means varies the amount of shading applied to each of said portions in proportion to the radial distance of the portions from the center of the fiber.

25. The apparatus for generating an image of a textile article in claim 22 in which said yarn image generating means includes scaling means for generating a plurality of longitudinal images of a yarn, each image having a different diameter.

26. The apparatus for generating an image of a textile article in claim 25 including selection means for selecting one of said yarn images to be utilized with said woven fabric generating means.

27. The apparatus for generating an image of a textile article in claim 22 in which said yarn image generating means includes rotating means for rotating the cross section fiber selection with respect to the longitudinal axis of a yarn to generate a spun fiber image.

28. The apparatus for generating an image of a textile article in claim 22 in which said weave matrix data storage means includes parameters distinctive to basic weave patterns and second user input means for receiving a user input selection of a desired basic weave pattern and remaining parameters required to generate a selected basic weave pattern.

29. The apparatus for generating an image of a textile article in claim 22 in which said weave matrix data storage means includes user input sketching means for receiving a user sketch of a desired weave and means for calculating an optimum CD/DID from a user sketch.

30. The apparatus for generating an image of a textile article in claim 29 in which said sketching means further includes manipulating means for allowing a user to adjust a CD/DID calculated from a user sketch.

31. The apparatus for generating an image of a textile article in claim 22 in which said weave matrix data storage means includes user input selection means for receiving a user input selection of CD/DID of a desired pattern.

32. The apparatus for generating an image of a textile article in claim 22 in which said woven fabric generating means includes yarn shading means for shading portions of yarn image in a woven fabric image including means responsive to the diameter of a yarn portion and the over/under relationship to intersecting yarn portions in a woven fabric image.

33. The apparatus for generating an image of a textile article in claim 22 in which said weave matrix data storage means includes data compression means for effecting bitwise compression of weave matrix stored therein.

34. A computer-assisted design system apparatus for generating an image of a textile article comprising:
yarn data storage means for storing data representative of a plurality of yarn designs;
weave matrix data storage means for storing parameters sufficient to specify a weave pattern; and
woven fabric image generating means for applying a set of weave pattern parameters to sets of yarn design data to generate an image of a fabric woven according to a weave pattern utilizing yarn represented by said sets of yarn design data, said woven fabric generating means including yarn shading means for individually shading portions of yarn in a woven fabric image.

35. The apparatus for generating an image of a textile article in claim 34 in which said yarn shading means is responsive to the diameter of a portion of yarn and the over/under intersecting yearn portions in a fabric image to determine the shade applied to the portion.

* * * * *

UNITED STATES PATENT AND TRADEMARK OFFICE
CERTIFICATE OF CORRECTION

PATENT NO. : 5,016,183

DATED : May 14, 1991

INVENTOR(S) : Emory Shyong

It is certified that error appears in the above-identified patent and that said Letters Patent is hereby corrected as shown below:

Abstract of the Disclosure, Line 6
  "images." should be --image.--;

Column 1, Line 59
  "traffic" should be --graphic--;

Column 5, Line 55
  "anY should be --any--;

Column 12, Claim 1, Line 60
  "or" should be --of--;

Column 13, Claim 7, Lines 43 and 44
  "diameter" should be --diameters--;

Column 16, Claim 35, Line 63
  "yearn" should be --yarn--.

Signed and Sealed this

Twelfth Day of January, 1993

*Attest:*

DOUGLAS B. COMER

*Attesting Officer*    *Acting Commissioner of Patents and Trademarks*